US011711388B2

(12) United States Patent
McLane et al.

(10) Patent No.: US 11,711,388 B2
(45) Date of Patent: Jul. 25, 2023

(54) AUTOMATED DETECTION OF MALWARE USING TRAINED NEURAL NETWORK-BASED FILE CLASSIFIERS AND MACHINE LEARNING

(71) Applicant: SparkCognition, Inc., Austin, TX (US)

(72) Inventors: Lucas McLane, Hutto, TX (US); Jarred Capellman, Round Rock, TX (US)

(73) Assignee: SPARKCOGNITION, INC., Austin, TX (US)

( * ) Notice: Subject to any disclaimer, the term of this patent is extended or adjusted under 35 U.S.C. 154(b) by 124 days.

(21) Appl. No.: 17/228,194

(22) Filed: Apr. 12, 2021

(65) Prior Publication Data
US 2021/0234880 A1 Jul. 29, 2021

Related U.S. Application Data

(63) Continuation of application No. 16/832,718, filed on Mar. 27, 2020, now Pat. No. 10,979,444, which is a
(Continued)

(51) Int. Cl.
*G06F 21/00* (2013.01)
*H04L 9/40* (2022.01)
(Continued)

(52) U.S. Cl.
CPC .......... *H04L 63/1425* (2013.01); *G06F 21/55* (2013.01); *G06F 21/563* (2013.01);
(Continued)

(58) Field of Classification Search
None
See application file for complete search history.

(56) References Cited

U.S. PATENT DOCUMENTS

| 5,724,593 | A | 3/1998 | Hargrave, III et al. |
| 6,006,221 | A | 12/1999 | Liddy et al. |

(Continued)

OTHER PUBLICATIONS

L. Sayfullina et al., "Efficient Detection of Zero-day Android Malware Using Normalized Bernoulli Naive Bayes," 2015 IEEE Trustcom/BigDataSE/ISPA, 2015, pp. 198-205, doi: 10.1109/Trustcom.2015.375. (Year: 2015).*

(Continued)

*Primary Examiner* — Jeffery L Williams
(74) *Attorney, Agent, or Firm* — Moore IP Law

(57) ABSTRACT

Automated malware detection for application file packages using machine learning (e.g., trained neural network-based classifiers) is described. A particular method includes generating, at a first device, a first feature vector based on occurrences of character n-grams corresponding to a first subset of files of multiple files of an application file package. The method includes generating, at the first device, a second feature vector based on occurrences of attributes in a second subset of files of the multiple files. The method includes sending the first feature vector and the second feature vector from the first device to a second device as inputs to a file classifier. The method includes receiving, at the first device from the second device, classification data associated with the application file package based on the first feature vector and the second feature vector. The classification data indicates whether the application file package includes malware.

20 Claims, 12 Drawing Sheets

Related U.S. Application Data continuation of application No. 15/639,805, filed on Jun. 30, 2017, now Pat. No. 10,616,252.

(51) Int. Cl.

| | | |
|---|---|---|
| *G06F 21/55* | (2013.01) | |
| *G06F 21/56* | (2013.01) | |
| *G06N 3/084* | (2023.01) | |
| *G06N 3/045* | (2023.01) | |
| *G06N 20/20* | (2019.01) | |
| *G06N 5/01* | (2023.01) | |

(52) U.S. Cl.
CPC ........... *G06F 21/564* (2013.01); *G06N 3/045* (2023.01); *G06N 3/084* (2013.01); *H04L 63/1416* (2013.01); *G06N 5/01* (2023.01); *G06N 20/20* (2019.01)

(56) References Cited

U.S. PATENT DOCUMENTS

| | | |
|---|---|---|
| 6,144,934 A | 11/2000 | Stockwell et al. |
| 6,167,398 A | 12/2000 | Wyard et al. |
| 6,311,183 B1 | 10/2001 | Cohen |
| 6,460,050 B1 | 10/2002 | Pace et al. |
| 6,578,032 B1 | 6/2003 | Chandrasekar et al. |
| 7,296,030 B2 | 11/2007 | Vo et al. |
| 7,305,385 B1 | 12/2007 | Dzikiewicz et al. |
| 7,873,947 B1 | 1/2011 | Lakhotia et al. |
| 8,037,535 B2 | 10/2011 | Maloof |
| 8,230,510 B1 | 7/2012 | Yang et al. |
| 8,233,726 B1 | 7/2012 | Popat et al. |
| 8,260,914 B1 | 9/2012 | Ranjan |
| 8,347,386 B2 | 1/2013 | Mahaffey et al. |
| 8,375,450 B1 | 2/2013 | Oliver et al. |
| 8,401,982 B1 | 3/2013 | Satish et al. |
| 8,631,330 B1 | 1/2014 | Hwang et al. |
| 8,726,391 B1 | 5/2014 | Zhong et al. |
| 8,789,172 B2 | 7/2014 | Stolfo et al. |
| 8,813,222 B1 | 8/2014 | Codreanu et al. |
| 8,826,439 B1 | 9/2014 | Hu et al. |
| 9,021,589 B2 | 4/2015 | Anderson et al. |
| 9,224,067 B1 | 12/2015 | Lu et al. |
| 9,280,747 B1 | 3/2016 | Jin et al. |
| 9,292,688 B2 | 3/2016 | Avasarala et al. |
| 9,407,653 B2 | 8/2016 | Nakawatase et al. |
| 9,646,158 B1 | 5/2017 | Shekokar et al. |
| 9,652,616 B1 | 5/2017 | Bhatkar et al. |
| 9,665,713 B2 | 5/2017 | Avasarala et al. |
| 9,667,653 B2 | 5/2017 | Barabash et al. |
| 9,690,938 B1 | 6/2017 | Saxe et al. |
| 9,705,904 B1 | 7/2017 | Davis et al. |
| 9,721,097 B1 | 8/2017 | Davis et al. |
| 9,858,345 B2 | 1/2018 | Zeljkovic et al. |
| 9,864,956 B1 | 1/2018 | Sai |
| 10,007,786 B1 | 6/2018 | Bhatkar et al. |
| 10,038,706 B2 | 7/2018 | Mekky et al. |
| 10,062,038 B1 | 8/2018 | Sai |
| 10,063,572 B2 | 8/2018 | Milazzo et al. |
| 10,068,187 B1 | 9/2018 | Sai |
| 10,075,453 B2 | 9/2018 | Adams et al. |
| 10,127,382 B2 | 11/2018 | Palumbo et al. |
| 10,193,902 B1 | 1/2019 | Caspi et al. |
| 10,685,293 B1 | 6/2020 | Heimann et al. |
| 11,556,648 B2 * | 1/2023 | Zhao .................. G06N 7/01 |
| 2002/0103783 A1 | 8/2002 | Muhlestein |
| 2003/0023866 A1 | 1/2003 | Hinchliffe et al. |
| 2003/0070088 A1 | 4/2003 | Gryaznov |
| 2003/0074183 A1 | 4/2003 | Eisele |
| 2004/0073810 A1 | 4/2004 | Dettinger et al. |
| 2004/0128355 A1 | 7/2004 | Chao et al. |
| 2006/0015326 A1 | 1/2006 | Mori et al. |
| 2006/0018541 A1 | 1/2006 | Chelba et al. |
| 2006/0037080 A1 | 2/2006 | Maloof |
| 2006/0100852 A1 | 5/2006 | Gamon et al. |
| 2007/0028302 A1 | 2/2007 | Brennan et al. |
| 2007/0230787 A1 | 10/2007 | Belitskaya et al. |
| 2008/0027934 A1 | 1/2008 | Duxbury |
| 2008/0120720 A1 | 5/2008 | Guo et al. |
| 2008/0184367 A1 | 7/2008 | McMillan et al. |
| 2008/0201779 A1 | 8/2008 | Tahan et al. |
| 2008/0263669 A1 | 10/2008 | Alme |
| 2009/0150308 A1 | 6/2009 | Wang et al. |
| 2009/0172815 A1 | 7/2009 | Gu et al. |
| 2009/0193293 A1 | 7/2009 | Stolfo et al. |
| 2010/0169244 A1 | 7/2010 | Zeljkovic et al. |
| 2010/0192222 A1 | 7/2010 | Stokes et al. |
| 2011/0044499 A1 | 2/2011 | Cobb et al. |
| 2011/0099635 A1 | 4/2011 | Silberman et al. |
| 2011/0179491 A1 | 7/2011 | Spurlock et al. |
| 2012/0084859 A1 | 4/2012 | Radinsky et al. |
| 2012/0155767 A1 | 6/2012 | Zhu et al. |
| 2012/0159620 A1 | 6/2012 | Seifert et al. |
| 2012/0159631 A1 | 6/2012 | Niemela et al. |
| 2012/0210423 A1 | 8/2012 | Friedrichs et al. |
| 2012/0239379 A1 | 9/2012 | Gershnik |
| 2012/0240236 A1 | 9/2012 | Wyatt et al. |
| 2012/0260342 A1 | 10/2012 | Dube et al. |
| 2012/0317644 A1 | 12/2012 | Kumar et al. |
| 2013/0110501 A1 | 5/2013 | Saikou et al. |
| 2013/0139261 A1 | 5/2013 | Friedrichs et al. |
| 2013/0191915 A1 | 7/2013 | Antonakakis et al. |
| 2013/0198119 A1 | 8/2013 | Eberhardt, III et al. |
| 2013/0227683 A1 | 8/2013 | Bettini et al. |
| 2013/0253910 A1 | 9/2013 | Turner et al. |
| 2013/0282645 A1 | 10/2013 | Culbertson et al. |
| 2013/0326625 A1 | 12/2013 | Anderson et al. |
| 2014/0019486 A1 | 1/2014 | Majumdar |
| 2014/0090061 A1 | 3/2014 | Avasarala et al. |
| 2014/0279763 A1 | 9/2014 | Madnani et al. |
| 2014/0283065 A1 | 9/2014 | Teddy et al. |
| 2014/0298461 A1 | 10/2014 | Hohndel et al. |
| 2015/0033341 A1 | 1/2015 | Schmidtler et al. |
| 2015/0052601 A1 | 2/2015 | White et al. |
| 2015/0106931 A1 | 4/2015 | Mankin et al. |
| 2015/0170649 A1 | 6/2015 | Ashikawa et al. |
| 2015/0193695 A1 | 7/2015 | Mota et al. |
| 2015/0248556 A1 | 9/2015 | Sickendick et al. |
| 2015/0302182 A1 | 10/2015 | Wyatt et al. |
| 2015/0379426 A1 | 12/2015 | Steele et al. |
| 2016/0065534 A1 | 3/2016 | Liu et al. |
| 2016/0099967 A1 | 4/2016 | Stemm et al. |
| 2016/0127397 A1 | 5/2016 | Mekky et al. |
| 2016/0151918 A1 | 6/2016 | Stoyanchev et al. |
| 2016/0241574 A1 | 8/2016 | Kumar et al. |
| 2016/0255107 A1 | 9/2016 | Qian et al. |
| 2016/0292276 A1 | 10/2016 | Denninghoff |
| 2016/0335435 A1 | 11/2016 | Schmidtler et al. |
| 2016/0378984 A1 | 12/2016 | Wojnowicz et al. |
| 2017/0004306 A1 | 1/2017 | Zhang et al. |
| 2017/0032279 A1 | 2/2017 | Miserendino et al. |
| 2017/0083825 A1 | 3/2017 | Battersby et al. |
| 2017/0085585 A1 | 3/2017 | Morkovský |
| 2017/0111515 A1 | 4/2017 | Bandyopadhyay et al. |
| 2017/0134397 A1 | 5/2017 | Dennison et al. |
| 2017/0142140 A1 | 5/2017 | Muddu et al. |
| 2017/0208084 A1 | 7/2017 | Steelman et al. |
| 2017/0208085 A1 | 7/2017 | Steelman et al. |
| 2017/0262633 A1 | 9/2017 | Miserendino et al. |
| 2017/0300632 A1 | 10/2017 | Bai |
| 2018/0012140 A1 | 1/2018 | Pistoia et al. |
| 2018/0012142 A1 | 1/2018 | Pistoia et al. |
| 2018/0046938 A1 | 2/2018 | Allen et al. |
| 2018/0048578 A1 | 2/2018 | Rollet |
| 2018/0052904 A1 | 2/2018 | Fusco et al. |
| 2018/0063169 A1 | 3/2018 | Zhao et al. |
| 2018/0124095 A1 | 5/2018 | Hamdi |
| 2018/0181752 A1 | 6/2018 | Guri et al. |
| 2018/0288077 A1 | 10/2018 | Siddiqui et al. |
| 2018/0314983 A1 | 11/2018 | Sai |
| 2019/0007433 A1 | 1/2019 | McLane et al. |

(56) References Cited

OTHER PUBLICATIONS

Guthrie, David & Allison, Ben & Liu, Wei & Guthrie, Louise & Wilks, Yorick. (2006). A Closer Look at Skip-gram Modelling. Proc. of the Fifth International Conference on Language Resources and Evaluation. (Year: 2006).

Kolter, et al., "Learning to Detect and Classify Malicious Executables in the Wild," Journal of Machine Learning Research, 2006, vol. 7, pp. 2721-2744.

* cited by examiner

1200

1201
Access information identifying multiple application file packages and identifying classification data for the multiple application file packages, the classification data indicating, for a particular application file package of the multiple application file packages, whether the particular application file package includes malware

1202
Generate first feature vectors for the multiple application file packages by, for each application file package, generating a first feature vector based on occurrences of n-grams corresponding to a first subset of the application file package

1203
Generate second feature vectors for the multiple application file packages by, for each application file package, generating a second feature vector based on occurrences of attributes corresponding to a second subset of the application file package

1204
Generate and store a file classifier using the first feature vectors, the second feature vectors, and the classification data as supervised training data

FIG. 12

AUTOMATED DETECTION OF MALWARE USING TRAINED NEURAL NETWORK-BASED FILE CLASSIFIERS AND MACHINE LEARNING

CROSS-REFERENCE TO RELATED APPLICATIONS

The present application claims priority to and is a continuation of U.S. patent application Ser. No. 16/832,718 entitled "AUTOMATED DETECTION OF MALWARE USING TRAINED NEURAL NETWORK-BASED FILE CLASSIFIERS AND MACHINE LEARNING," filed Mar. 27, 2020, which is a continuation of U.S. patent application Ser. No. 15/639,805 entitled "AUTOMATED DETECTION OF MALWARE USING TRAINED NEURAL NETWORK-BASED FILE CLASSIFIERS AND MACHINE LEARNING," filed Jun. 30, 2017 and now granted as U.S. Pat. No. 10,616,252, the contents of which are incorporated herein by reference in their entirety.

BACKGROUND

Computing devices have increasingly become targets of malicious actors through use of malware. Some types of malware, such as viruses, can cause loss of important business or personal data. Other types of malware, such as spyware, can enable malicious actors to gain access to confidential information.

Many malware detection applications use signatures (or malware definitions) to detect malware. For example, an executable file that includes malware may be processed using a hash function to generate a hash value. The hash value may act as a signature of the entire executable file or of a malware portion of the executable file. The signature may be provided to users of a malware detection application via a malware definitions update. During operation, the malware detection application compares a signature of a malware application in the malware definitions to files in memory or to received files to determine whether the files include the malware that corresponds to the signature. One problem with detecting malware in this way is that new malware can be generated very quickly, potentially at a rate that is equal to or greater than distribution of new malware definitions. Accordingly, it is not unusual for a new malware or new malware-containing file to be distributed to many consumers before the consumers receive appropriate malware definitions updates to enable detection of the new malware. For example, the new malware or new malware-containing file may be distributed as part of an application file package. Because the new malware or new malware-containing file may not have a corresponding signature, the new malware or new malware-containing file may not be identified as malware and may be executed by a computing device, thereby exposing the computing device to the malware.

SUMMARY

Particular implementations of systems and methods for automated detection of malware in application file packages using machine learning are described herein. As described herein, a neural network-based file classifier (or other file classifier that incorporates other artificial intelligence or machine learning processes, such as a decision tree network or a support vector machine) may be trained to detect application file packages that contain malware, and the neural network-based file classifier may be implemented as part of an automated malware detection and protection system. For example, a set of malware containing application file packages (e.g., multiple files associated with an application) and a set of non-malware containing application file packages may be used as training data to build a classifier (e.g., a data model configured to classify an application file package as malware containing or non-malware containing based on non-linear analysis of features of one or more files of the application file package). The application file package may include a plurality of files that enable execution of an application, such as a social media application, a gaming application, or another type of application, at a computing device that runs a particular operating system or platform. In a particular implementation, the application file package may include or correspond to a mobile application (e.g., an application executed by a mobile device).

The classifier (or "file classifier") may include a decision tree, a support vector machine, a deep neural network, or another type of trained data model (or application that executes based on a data model) to detect malware. For example, the classifier may include a data structure that describes a feed-forward neural network data model, where the feed-forward neural network data model includes one or more input nodes, hidden nodes, and output nodes. In a particular implementation, the feed-forward neural network data model includes one or more hidden layers (e.g., the feed-forward neural network is a deep neural network). The neural network may be configured to implement machine learning via a training process. In this example, the configuration of the neural network is trained (e.g., using a gradient decent process that may include back propagation), based on features associated with training data (e.g., the set of malware containing application file packages, the set of non-malware containing application file packages, and classification information associated with each application file package) to identify patterns in the features that correspond to malware and patterns in the features that correspond to non-malware.

Subsequently, to determine whether a new application file package includes malware, features are extracted from the new application file package and provided as input to the classifier. The classifier generates a result indicating that the application file package likely includes malware (e.g., due to the features of the new application file package resembling the features of malware containing application file packages used to train the classifier) or a result indicating that the application file package likely does not include malware (e.g., due to the features of the new application file package resembling the features of non-malware containing application file packages used to train the classifier). Because the classifier is trained using a plurality of sample application file packages (and indications whether the sample application file packages contain malware), the classifier may be able to identify new malware in application file packages based on the patterns in features of the application file packages.

In a particular example disclosed herein, the classifier may be trained using features derived from a first subset of files of the application file package and a second subset of files of the application file package. The first subset of files may include binary files. Binary files may be executable files or files that contain executable portions in a binary form. Binary files may be processed to generate first features by converting the binary files into feature data. The first feature data may include a set of characters (e.g., printable characters or entropy indicators) based on the binary files, as described further below. In some implementations, a hash function is applied to sets of characters, as described further below. The second subset of files may include non-executable files, such as a manifest file as a particular, non-limiting example. The non-executable files may be processed to generate second features by analyzing the non-executable files to determine occurrences of attributes in the non-executable files. In some implementations, the attributes include requests for system permissions, references to application program interface (API) classes, or both. The second feature data may include a set of attributes that are identified as occurring in the non-executable files, as described further below. The first feature data and the second feature data may be used to generate one or more first feature vectors and one or more second feature vectors that are provided as input (e.g., supervised training data) to train a file classifier to determine whether or not particular application file packages contain malware.

In some implementations, the supervised training data may indicate particular types of malware associated with the malware containing files. In such implementations, the file classifier may be trained to distinguish malware containing application file packages from non-malware containing application file packages, and to distinguish the different types of malware within the malware containing files. For example, the file classifier may be trained to indicate that a particular file is free of malware, contains a virus, contains a worm, contains a trojan, contains spyware, contains ransomware, contains adware, etc.

In some implementations, the classification of a new application file package may be distributed across multiple devices. For example, a mobile device may receive a new application file package. Prior to executing any of the files within the application file package, the mobile device may extract features from subsets of files of the application file package, and the mobile device may generate and send feature vectors indicating the extracted features to a server or other device that stores a trained file classifier. The server (or other device) may use the feature vectors as input to the trained file classifier to determine a classification of whether the application file package contains malware. The server may send classification data indicating whether the application file package includes malware to the mobile device, and the mobile device may perform one or more operations based on the classification data. For example, the mobile device may install and execute files of the application file package based on the classification data indicating that the application file package does not contain malware. Alternatively, the mobile device may perform one or more protective operations (e.g., deleting the application file package, quarantining the application file package, adding the application file package to a list of known malware-containing application file packages, etc.) based on the classification data indicating that the application file package contains malware. By distributing operations across multiple devices (e.g., the mobile device and the server), mobile devices that may not have the processing or memory resources to train and store file classifiers can still receive classification data from trained file classifiers.

One advantage of using a file classifier rather than signature data is that the file classifier may be able to identify malware that has not been specifically used to train the file classifier. For example, a trained file classifier may be able to identify application file packages that contain so called "zero day" malware, for which no malware definition is yet available. Another advantage is that the file classifier may occupy a relatively a smaller portion of memory than a large set of malware definitions. Another advantage is that a device with less computing resources (e.g., a mobile device) may be able to generate feature vectors that are sent to another device with sufficient computing resources to use a trained classifier, and the mobile device can receive classification data from the classifier stored at the other device. Further, scanning a file by generating a hash of the application file package and comparing the hash to every hash in a set of malware definitions may take longer than providing features representing subsets of files of the application file package to the classifier and generating a classification result. Further, the file classifier can be combined with other approaches to provide more robust malware protection. For example, a hash can be generated of a new application file package and compared to hash values of known good (e.g., non-malware containing) application file packages, to hash values of known bad (e.g., malware containing) application file packages, or both, to determine whether the new application file package contains malware. Regardless of whether the comparison of hash values indicates that the new application file package contains malware, features may be extracted from the new application file package and provided to the file classifier to generate a classification result indicating whether the new application file package contains malware. Accordingly, in this example, the file classifier-based process and the signature-based process provide complementary and substantially independent layers of malware detection, which may improve the likelihood of detecting malware containing application file packages.

In a particular aspect, a computing device includes a memory configured to store instructions and a processor configured to execute the instructions from the memory. Execution of the instructions causes the processor to perform operations including generating a first feature vector based on occurrences of character n-grams corresponding to a first subset of files of multiple files included in an application file package. The operations include generating a second feature vector based on occurrences of attributes in a second subset of files of the multiple files. The operations include sending the first feature vector and the second feature vector to a computing device as inputs to a file classifier. The operations also include receiving, from the computing device, classification data associated with the application file package based on the first feature vector and the second feature vector. The classification data indicates whether the application file package includes malware.

In another particular aspect, a method includes generating, at a first device, a first feature vector based on occurrences of character n-grams corresponding to a first subset of files of multiple files included in an application file package. The method includes generating, at the first device, a second feature vector based on occurrences of attributes in a second subset of files of the multiple files. The method includes sending the first feature vector and the second feature vector from the first device to a second device as inputs to a file classifier. The method further includes receiving, at the first device from the second device, classification data associated with the application file package based on the first feature vector and the second feature vector. The classification data indicates whether the application file package includes malware.

In another particular aspect, a computer-readable storage device stores instructions that, when executed, cause a computer to perform operations including generating a first feature vector based on occurrences of character n-grams corresponding to a first subset of files of multiple files included in an application file package. The operations include generating a second feature vector is based on occurrences of attributes in a second subset of files of the multiple files. The operations include sending the first feature vector and the second feature vector to a computing device as inputs to a file classifier. The operations also include receiving, from the computing device, classification data associated with the application file package based on the first feature vector and the second feature vector. The classification data indicates whether the application file package includes malware.

In a particular aspect, a computing device includes a memory configured to store instructions to generate a file classifier and a processor configured to execute the instructions from the memory. Execution of the instructions causes the processor to perform operations including accessing information identifying multiple application file packages and identifying classification data for the multiple application file packages, where the classification data indicates, for a particular application file package of the multiple application file packages, whether the particular application file package includes malware. The operations include generating first feature vectors for the multiple application file packages by, for each application file package, generating a first feature vector based on occurrences of character n-grams corresponding to a first subset of files of multiple files included in the application file package. The operations include generating second feature vectors for the multiple application file packages by, for each application file package, generating a second feature vector based on occurrences of attributes in a second subset of files of the multiple files. The operations also include generating and storing a file classifier using the first feature vectors, the second feature vectors, and the classification data as supervised training data.

In another particular aspect, a method includes accessing information identifying multiple application file packages and identifying classification data for the multiple application file packages, where the classification data indicates, for a particular application file package of the multiple application file packages, whether the particular application file package includes malware. The method includes generating first feature vectors for the multiple application file packages by, for each application file package, generating a first feature vector based on occurrences of character n-grams corresponding to a first subset of files of multiple files included in the application file package. The method includes generating second feature vectors for the multiple application file packages by, for each application file package, generating a second feature vector based on occurrences of attributes in a second subset of files of the multiple files. The method also includes generating and storing a file classifier using the first feature vectors, the second feature vectors, and the classification data as supervised training data.

In another particular aspect, a computer-readable storage device stores instructions that, when executed, cause a computer to perform operations including accessing information identifying multiple application file packages and identifying classification data for the multiple application file packages, where the classification data indicates, for a particular application file package of the multiple application file packages, whether the particular application file package includes malware. The operations include generating first feature vectors for the multiple application file packages by, for each application file package, generating a first feature vector based on occurrences of character n-grams corresponding to a first subset of files of multiple files included in the application file package. The operations include generating second feature vectors for the multiple application file packages by, for each application file package, generating a second feature vector based on occurrences of attributes in a second subset of files of the multiple files. The operations further include generating and storing a file classifier using the first feature vectors, the second feature vectors, and the classification data as supervised training data.

BRIEF DESCRIPTION OF THE DRAWINGS

FIG. 12 is a flowchart illustrating a particular example of a method of generating a trained file classifier.

DETAILED DESCRIPTION

Figure 1:
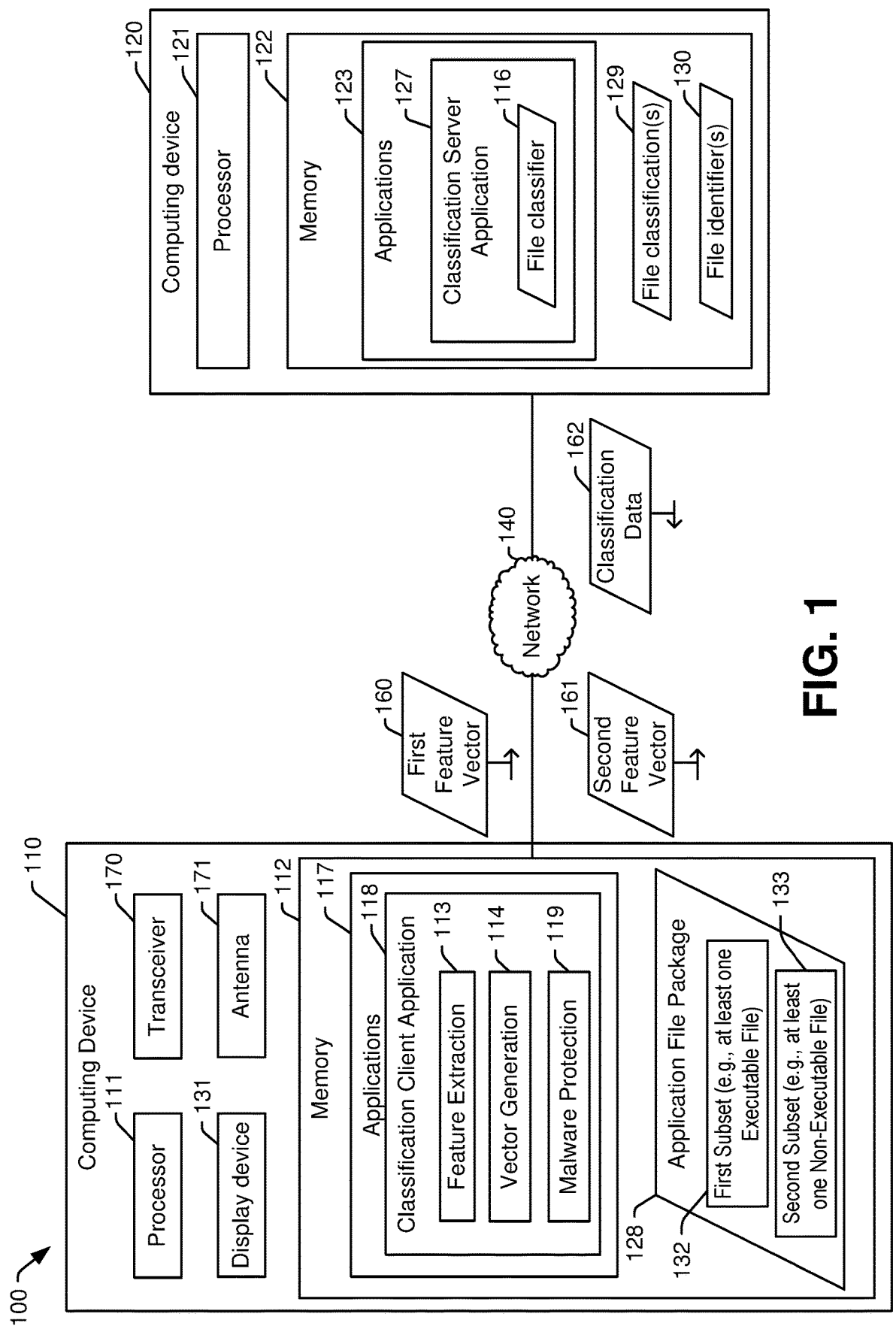
FIG. 1 illustrates a particular example of a system that is operable to generate feature vectors and to use a trained file classifier for malware detection.

FIG. 1 illustrates a first example of a system 100 that is operable to generate feature vectors and to use a trained file classifier for malware detection. The system 100 implements machine learning techniques via use of the trained file classifier to enable automated malware detection that may be able to detect malware that would otherwise not be detected by other malware detection systems, such as signature-based malware detection systems that do not implement machine learning. The system 100 may thereby enable automated detection of malware and protection (e.g., via one or more protection operations).

The system 100 includes a first computing device 110 configured to generate feature vectors based on a particular application file package and a second computing device 120 configured to use a file classifier to determine whether or not the particular application file package includes malware. Although illustrated as two distinct computing devices in FIG. 1, in some implementations, the first computing device 110 may include the second computing device 120. For example, the first computing device 110 may be configured to both generate the feature vectors and use the file classifier.

The first computing device 110 may include a smart phone, a mobile communication device, a portable computer, a stationary (e.g., desktop or rack-mounted) computer, a tablet, a personal digital assistant (PDA), a set top box device, a video player, an entertainment unit, a display device, a television, a gaming console, a music player, a radio, a camera, a navigation device, an on-board component of a vehicle, an "internet-of-things" device (such as a smart home controller or sensor), or a combination thereof. In some implementations, the second computing device 120 includes or corresponds to a server, such as an enterprise server or a "master" server. In other implementations, the second computing device 120 includes or corresponds to a smart phone, a mobile communication device, a portable computer, a stationary (e.g., desktop or rack-mounted) computer, a tablet, a PDA, a set top box device, a video player, an entertainment unit, a display device, a television, a gaming console, a music player, a radio, a camera, a navigation device, an on-board component of a vehicle, an "internet-of-things" device (such as a smart home controller or sensor), or a combination thereof.

In a particular aspect, the first computing device 110 may be relatively resource constrained. For example, a processor 111 of the first computing device 110 may have less processing capability than a processor 121 of the second computing device 120. To illustrate, the first computing device 110 may be a mobile device with less processing resources than the second computing device 120. As another example, the first computing device 110 may be portable, and may therefore have a portable power supply, such as a battery. To avoid straining the resources of the first computing device 110, the first computing device 110 may offload some processing, such as file classification, to the second computing device 120, as described further below.

The first computing device 110 may include a display device 131, a memory 112, the processor 111, a transceiver 170, and an antenna 171. The processor 111 may be configured to execute instructions from the memory 112 to perform various operations. For example, the memory 112 may include one or more applications 117, such as a browser application, a word processing application, an e-mail application, and so forth. The memory 112 may also include an operating system and associated utility applications, such as a file browser. In FIG. 1, the memory 112 also includes a classification client application 118. The display device 131 may be configured to display an output based on the one or more applications or the classification client application 118, as further described herein. For example, the display device 131 may include a monitor, a touchscreen, another type of display device, or a combination thereof. The transceiver 170 may be configured to transmit data to other devices, to receive data from other devices, or both, via one or more networks. In other implementations, the first computing device 110 may include a transmitter, a receiver, or both, instead of the transceiver 170. The antenna 171 may be configured to send or receive wireless signals from other computing devices.

The classification client application 118 may include instructions to cause the processor 111 to extract feature data and generate feature vectors as part of a process to determine whether an application file package 128 contains malware. The application file package 128 includes multiple files that correspond to an application to be run on the first computing device 110. For example, the application file package 128 may correspond to a gaming application, a social media application, a media content application, other types of applications, or a combination thereof. In a particular implementation, the application file package 128 corresponds to a mobile device application (e.g., an application for execution at a mobile device). In some implementations, the application file package 128 is downloaded to the first computing device 110 from an application store or application marketplace (e.g., a place where one or more applications are available and may be downloaded for free or after being purchased). In other implementations, the application file package 128 is received from a different source.

The application file package 128 may include multiple files that include an executable file and a non-executable file. For example, the application file package 128 may include one or more executable files that are executable (or that contain portions that are executable) to cause the processor 111 to install, to execute (e.g., to run), or both, a particular application at the first computing device 110. The one or more executable files may include one or more binary files. The one or more binary files may be executable files or files that contain executable portions in a binary form. The application file package 128 may also include one or more non-executable files, such as one or more files that indicate information, such as a name of the application, a version of the application, a developer or designer of the application, files included in the application file package 128, occurrences of particular attributes (e.g., requests for system permissions, API class references, etc.), or a combination thereof.

In some implementations, at least some of the files of the application file package 128 are not analyzed to extract feature data for use in determining whether the application file package 128 contains malware. For example, the application file package 128 may include a first subset of files 132 from which feature data is extracted, a second subset of files 133 from which feature data is extracted, and one or more additional files that are not used to generate feature data. The first subset of files 132 includes at least one executable file, and the second subset of files 133 includes at least one non-executable file. For example, the multiple files of the application file package 128 may include an executable file, a manifest file, a compiled resources file, and one or more other files. In this example, the first subset of files 132 includes at least the executable file, and the second subset of files 133 includes at least the manifest file and the compiled resources file. Although described as different subsets, in some implementations, the first subset of files 132 and the second subset of files 133 are referred to as a single subset of files.

In a particular implementation, the application file package 128 is an Android Package Kit (APK) file. The APK file is an archive file that includes multiple files (including executable file(s) and non-executable file(s)) that correspond to a particular application for execution using the Android® platform (trademark of Google, Mountain View, Calif.). The APK file may include an executable file, such as a "classes.dex" file (e.g., multiple classes are converted into a single compressed, executable file), a "AndroidManifest.xml" file (e.g., a manifest file that includes the name, version, access rights, and referenced library files for the application), a "resources.arsc" file (e.g., a compiled resources file that includes precompiled resources, such as binary XML), and one or more additional files (an additional resource directory, a meta-information directory, a directory containing complied code specific to one or more software layers, an additional resource file, an assets directory, etc.). In a particular implementation, the first subset of files 132 may include the classes.dex file and the second subset of files 133 includes the AndroidManifest.xml file and the resources.arsc file. In other implementations, the application file package 128 includes or corresponds to other file types, such as an .ipa file (or other file package type) associated with Apple® platforms or operating systems (trademark of Apple Inc., Cupertino, Calif.) or another application file package type.

The classification client application 118 may include feature extraction instructions 113, vector generation instructions 114, and malware protection instructions 119. As described further below, the feature extraction instructions 113 are executable to extract features from one or more files of the application file package 128 and to provide the features to the vector generation instructions 114. Examples of features that may be extracted by the feature extraction instructions 113 include a string (or set of characters) representing binary content of a particular file of the application file package 128. Another example of features that may be extracted by the feature extraction instructions 113 includes a reduced set of characters (generated by application of a hash function) representing binary content of at least one file (e.g., the first subset of files 132) of the application file package 128. Another example of features that may be extracted by the feature extraction instructions 113 includes entropy indicators representing binary content of a particular file of the application file package 128. Another example of features that may be extracted by the feature extraction instructions 113 includes attributes in one or more files (e.g., the second subset of files 133) of the application file package 128. The attributes may include requests for system permissions indicated by the second subset of files 133 or references to application programming interface (API) classes associated with an operating system (or platform) executed by the processor 111 and indicated by the second subset of files 133, as further described herein.

The vector generation instructions 114 are executable by the processor 111 to generate feature vectors based on features extracted by the feature extraction instructions 113. For example, a first feature vector 160 may be generated based on occurrences of character n-grams corresponding to the first subset of files 132. The character n-grams may be based on physical characters that represent one or more files of the application file package 128, such as the first subset of files 132. Extraction of features and generation of feature vectors based on character n-grams is described further herein with reference to FIGS. 4, 5, and 8. As another example, a second feature vector 161 may be generated based on occurrences of attributes in the second subset of files 133. The attributes may include or correspond to requests for system permissions, API class references, or both, within one or more files of the application file package 128, such as the second subset of files 133. Extraction of features and generation of feature vectors based on occurrences is described further herein, with reference to FIGS. 6-7. The malware protection instructions 119 are executable by the processor 111 to initiate performance of one or more protection operations. For example, the one or more protection operations may include quarantining an application file package that contains malware, deleting the application file package, providing the application file package to be used as training data, or another operation, as further described herein.

The classification client application 118 may be configured to send the first feature vector 160 and the second feature vector 161 (e.g., data characteristic of the application file package 128) to the second computing device 120 via a network 140. For example, the first computing device 110 may be configured to send the first feature vector 160 and the second feature vector 161 via the Internet (e.g., the network 140) to the second computing device 120. In an alternate implementation, the extracted feature data is sent from the first computing device 110 to the second computing device 120, and the second computing device 120 includes vector generation instructions configured to generate feature vectors based on the extracted feature data.

The second computing device 120 may include a memory 122 and the processor 121. The second computing device 120 may also include a transceiver and an antenna (not shown). The processor 121 may be configured to execute instructions from the memory 122 to perform various operations. For example, the memory 112 may include an operating system and associated utility applications, such as a file browser. In FIG. 1, the memory 122 also includes a classification server application 127. The classification server application 127 may be executed by the processor 121 to use a file classifier 116 to detect malware in one or more application file packages.

As used herein, a "file classifier" refers to a data model or a set of parameters that characterize a data model, where the data model is generated via a machine learning technique, such as by iterative modification of parameters based on supervised training data. As such, the file classifier disclosed herein may also be referred as a "trained file classifier" to denote that the file classifier is generated, based on supervised training data, using a machine learning technique. The file classifier 116 may be trained based on a plurality of application file packages and data indicating whether each application file package contains malware (or a particular type of malware that is contained within particular application file packages). Training of the file classifier 116 is further described herein with reference to FIG. 2.

The file classifier 116 may include a decision tree, a support vector machine, a neural network, or another type of trained data model (or application that executes based on a data model) to detect malware. For example, the file classifier 116 may include a data structure that describes a neural network data model, where the neural network data model includes one or more input nodes, interior nodes, and output nodes. In a particular implementation, the file classifier 116 includes a feed-forward neural network that is trained using back propagation. The feed-forward neural network may include a deep neural network (DNN) that includes at least one hidden layer. In a particular implementation, the file classifier 116 includes a DNN that includes three hidden layers. In other implementations, the file classifier 116 includes fewer than three or more than three hidden layers. In another particular implementation, the file classifier 116 may include a convolutional neural network (e.g., a neural network that performs one or more convolution operations), a shift invariant neural network, or a space invariant artificial neural network (SIANN). The convolutional neural network may be configured to exploit locality (e.g., spatial relationships) of features extracted from application file packages.

The feature vectors 160 and 161 received via the network 140 from the first computing device 110 are provided as input to the file classifier 116. The file classifier 116 generates classification data 162 indicating whether or not the application file package 128 includes malware (e.g., a classification result) based on the first feature vector 160 and the second feature vector 161. An example of use of the file classifier 116 by the classification server application 127 is described with reference to FIG. 9. The second computing device 120 may be configured to send the classification data 162 to the first computing device 110 via the network 140.

The first computing device 110 may be configured to receive the classification data 162 associated with the application file package 128. In certain implementations, the classification client application 118 may be configured to provide an output to the display device 131. For example, when the application file package 128 contains malware, the classification client application 118 may provide an alert via the display device 131 to notify a user that the application file package 128 is unsafe.

Additionally or alternatively, the classification client application 118 may be configured to initiate performance of one or more malware protective operations based on the classification data 162 indicating that the application file package 128 contains malware. For example, the processor 111 may execute the malware protection instructions 119 to initiate performance of one or more malware protection operations based on the classification data 162 indicating that the application file package 128 contains malware. As a particular example, a quarantine operation may be initiated based on the application file package 128 containing malware. To illustrate, the processor 111 may cause the application file package 128 to be stored at a separate memory (or a separate portion of the memory 112) based on the application file package 128 containing malware. Files executed from the separate memory (or separate portion of the memory 112) may be prohibited from accessing system resources or from altering data outside of the separate memory (or the separate portion of the memory 112). As another example, the malware protection operation may include file deletion. For example, the application file package 128 may be deleted based on the classification data 162 indicated that the application file package 128 includes malware. As another example, the application file package 128 may be sent from the first computing device 110 to another device for additional analysis or for use as training data for file classifiers. The application file package 128 may be deleted after being sent to the other device.

In some implementations, the processor 121 of the second computing device may store information indicating the classification result at the memory 122. For example, a file identifier 130 of the application file package 128 and the classification result of the application file package 128 may be stored as file classification data 129. In some implementations, the file identifier 130 of the application file package 128 may include or correspond to a hash value based on the application file package 128. For example, the file identifier 130 may include a hash value of the feature vectors 160 and 161. In such implementations, the file identifier 130 and file classification data 129 may be retained in the memory 122 as a whitelist or blacklist. For example, when feature vectors corresponding to a new application file package, not shown, are received at the second computing device 120, the classification server application 127 may generate a hash value based on the feature vectors of the new application file package, and the hash value of the feature vectors of the new application file package may be compared to file identifiers 130 in the memory 122 to determine whether the new application file package has been classified by the file classifier 116. If the new application file package has already been classified by the file classifier 116, the processor 121 may forego classification of the new application file package using the file classifier 116. However, if the new application file package was classified using a prior file classifier (or a prior version of the file classifier 116), the processor 121 provides the feature vectors of the new application file package to the file classifier 116 to determine whether the file classifier 116 detects malware that was undetected by the prior file classifier or fails to detect malware that was detected by the prior file classifier. In other implementations, the file classification data 129 and the file identifiers 130 are generated and stored at the memory 112 of the first computing device 110.

During operation, the first computing device 110 may receive (or have stored) the application file package 128. For example, a user of the first computing device 110 may download the application file package 128 from an application store or exchange, as a non-limiting example. The processor 111 may execute the feature extraction instructions 113 to extract first feature data (e.g., data indicating features based on occurrences of character n-grams corresponding to the first subset of files 132) and second feature data (e.g., data indicating features based on occurrences of attributes in the second subset of files 133). The processor 111 may execute the vector generation instructions to generate the first feature vector 160 based on the first feature data and the second feature vector 161 based on the second feature data. The first computing device 110 (e.g., the transceiver 170 and the antenna 171) may send the feature vectors (e.g., the first feature vector 160 and the second feature vector 161) via the network 140 to the second computing device 120.

The processor 121 of the second computing device 120 may execute the classification server application 127 to provide the feature vectors as inputs to the file classifier 116. Prior to receiving the feature vectors as inputs, the file classifier 116 is trained to identify malware (or types of malware) based on feature vectors, as further described herein. The file classifier 116 may generate the classification data 162 based on the feature vectors. The classification data 162 may indicate whether the application file package 128 includes malware. The classification data 162 may be sent to the first computing device 110 for use at the first computing device 110. For example, a display that indicates that the application file package 128 contains malware may be initiated at the display device 131 based on the classification data 162 indicating that the application file package 128 includes malware.

One advantage of the system 100 is that the file classifier 116 may be able to use machine learning techniques to identify malware that has not been specifically used to train the file classifier 116. For example, a trained file classifier may be able to identify application file packages that contain so called "zero day" malware, for which no malware definition is yet available. Thus, the system 100 may enable automated malware detection at mobile devices of "zero day" malware that may otherwise be undetectable. Detecting the zero day malware and performing one or more malware protection operations may prevent (or reduce a likelihood) that malware is able to damage or degrade security of computing devices. Another advantage is that a device with less computing resources (e.g., the first computing device 110) may be able to generate feature vectors that are sent to another device (e.g., the second computing device 120) with sufficient computing resources to use a trained classifier, and the first computing device 110 (e.g., a mobile device) can receive the classification data 162 that is generated by the file classifier 116 without having to store and operate the file classifier 116 at the first computing device 110 (which may not be possible due to computing resources of the first computing device 110).

Figure 2:
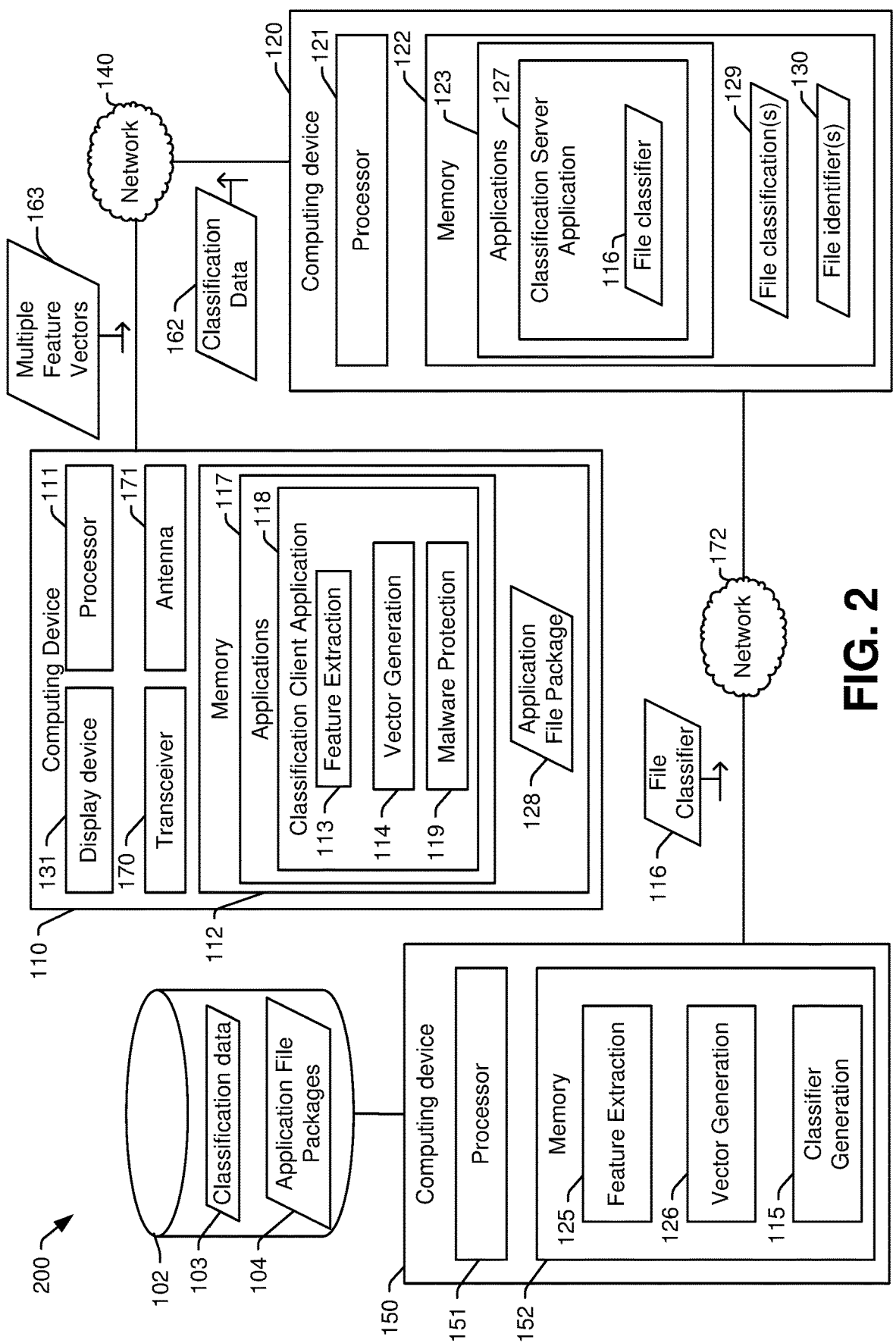
FIG. 2 illustrates a particular example of a system that is operable to generate and use a trained file classifier for malware detection.

FIG. 2 illustrates a second example of a system 200 that is operable to generate and use a trained file classifier for malware detection. The system 200 includes a first computing device 110 configured to generate feature vectors to be analyzed using a file classifier, a second computing device 120 configured to use the file classifier to determine whether or not a particular application file package includes malware, and a third computing device 150 configured to generate and train the file classifier used by the second computing device 120. Although the second computing device 120 and the third computing device 150 are illustrated as two distinct computing devices in FIG. 2, in some implementations, the second computing device 120 may include the third computing device 150. For example, the second computing device 120 may be configured to both generate and use the file classifier 116. Further, although only one second computing device 120 is illustrated in FIG. 2, in other implementations, the third computing device 150 may distribute the file classifier 116 to many other computing devices, such as server computing devices or client computing devices.

The first computing device 110 and the second computing device 120 of FIG. 2 include the same features as and operate in the same manner as the first computing device 110 and the second computing device 120 of FIG. 1, respectively. To illustrate, the first computing device 110 may be configured to generate the first feature vector 160 based on occurrences of character n-grams corresponding to the first subset of files 132 and a second feature vector 161 based on occurrences of attributes in the second subset of files 133, as described with reference to FIG. 1. The first computing device 110 may be configured to send multiple feature vectors 163 (e.g., at least the first feature vector 160 and the second feature vector 161) to the second computing device 120. In a particular implementation, each feature vector of the multiple feature vectors 163 is sent individually (e.g., as a separate feature vector). In another particular implementation, the first computing device 110 may be configured to combine the multiple feature vectors 163 (e.g., the first feature vector 160, the second feature vector 161, and any other feature vectors) to generate a single feature vector that is sent to the second computing device 120. The multiple feature vectors 163 may be combined by concatenating one or more feature vectors to one or more other feature vectors of the multiple feature vectors 163, or the multiple feature vectors 163 may be combined in some other way. The second computing device 120 may be configured to use the multiple feature vectors 163 as inputs to the file classifier 116 to generate the classification data 162 that indicates whether the application file package 128 includes malware. The first computing device 110 may be configured receive the classification data 162, as described with reference to FIG. 1.

The system 200 also includes the third computing device 150. The third computing device 150 may include a memory 152 and a processor 151. The third computing device 150 may also include a transceiver and an antenna (not shown). The processor 151 may be configured to execute instructions from the memory 152 to perform various operations. In FIG. 2, the memory 152 stores instructions executable by the processor 151 to generate the file classifier 116. For example, the memory 152 may store an automated model building application or an application that is executable to access training data, generate a data model based on training data 102, and output data corresponding to the data model as the file classifier 116.

The training data 102 may include a plurality of application file packages 104 and classification data 103 associated with each of the application file packages 104. The classification data 103 for a particular application file package indicates whether or not the particular application file package includes malware. Alternately, or in addition, if the particular application file package includes malware, the classification data 103 may indicate a particular type of malware (e.g., a trojan, a worm, spyware, adware, etc.) contained by the particular application file package.

In FIG. 2, the instructions executable by the processor 151 to generate the file classifier 116 based on the training data 102 include feature extraction instructions 125, vector generation instructions 126, and classifier generation instructions 115. In a particular implementation, the feature extraction instructions 125 perform operations similar to the operations performed by the feature extraction instructions 113. For example, if the feature extraction instructions 113 generate file features by extracting printable characters, then the feature extraction instructions 125 also generate file features by extracting printable characters. As another example, if the feature extraction instructions 113 generate file features by extracting printable characters and performing a hash function on the extracted printable characters, then the feature extraction instructions 125 also generate file features by extracting printable characters and performing a hash function on the extracted printable characters. As another example, if the feature extraction instructions 113 generate file features by generating entropy indicators, then the feature extraction instructions 125 also generate file features by extracting entropy indicators. As another example, if the feature extraction instructions 113 generate file features by identifying requested system permissions (e.g., first attributes), then the feature extraction instructions 125 also generate file features by identifying requested system permissions. As yet another example, if the feature extraction instructions 113 generate file features by identifying API class references (e.g., second attributes), then the feature extraction instructions 125 also generate file features by identifying API class references. Based on the foregoing, the feature extraction instructions 113 and the feature extraction instructions 125 may generate file features using multiple techniques, or a combination thereof.

In a particular implementation, the vector generation instructions 126 perform operations similar to the operations performed by the vector generation instructions 114. For example, if the vector generation instructions 114 generate the first feature vector 160 based on the first subset of files 132 of the application file package 128, then the vector generation instructions 126 generate first feature vectors based on occurrences of character n-grams corresponding to first subsets of files (e.g., files that include at least one executable file) of the application file packages 104. As another example, if the vector generation instructions 114 generate the second feature vector 161 based on the second subset of files 132 of the application file package 128, then the vector generation instructions 126 generate second feature vectors based on occurrences of attributes in second subsets of files (e.g., files that include at least one non-executable file) of the application file packages 104. The feature vectors (e.g., the first feature vectors and the second feature vectors), in combination with a corresponding portion of the classification data 103, are used as supervised training data to generate and test the file classifier 116. For example, supervised training data for a particular application file package may include feature vectors and classification information associated with the particular application file package.

The classifier generation instructions 115 uses a machine learning technique (e.g., an iterative model building process) to build a data model of a portion of the training data 102. The data model is iteratively trained, e.g., using a gradient decent process, to reduce or minimize an error between a classification output by the data model for a particular application file package and a classification assigned to the particular application file package in the classification data 103. After a training criterion is satisfied (e.g., after a particular number of iteration, or after additional iterations cease to reduce the error), a second portion of the training data 102 is used to test the data model. During testing of the data model, an application file package from the training data 102 that was not used to generate the data model is processed to generate feature vectors (e.g., at least a first feature vector and a second feature vector, as described with reference to FIG. 1) as input to the data model. A classification of the application file package assigned by the data model is compared to classification data associated with the application file package to determine whether the data model correctly classified the application file package. After multiple tests, if the data model performs adequately (e.g., the data model correctly classifies a threshold portion of tested application file packages) data representing the data model may be output as the file classifier 116. If the data model does not perform adequately (e.g., the data model incorrectly classifies a threshold portion of tested application file packages) additional training iterations may be performed.

After the third computing device 150 generates the file classifier 116, the file classifier 116 may be provided (e.g., via a network 172) to the second computing device 120 for use in detecting malware. The file classifier 116 may also be distributed to other computing devices, such as other servers, for use in detecting malware. The file classifier 116 may be used by the second computing device 120 to determine whether application file packages contain malware, as described with reference to FIG. 1. Because malware is detected using the trained file classifier 116, "zero-day" malware may be detected that may otherwise be missed (e.g., by other types of malware detection, such as signature-based malware detection).

Figure 3:
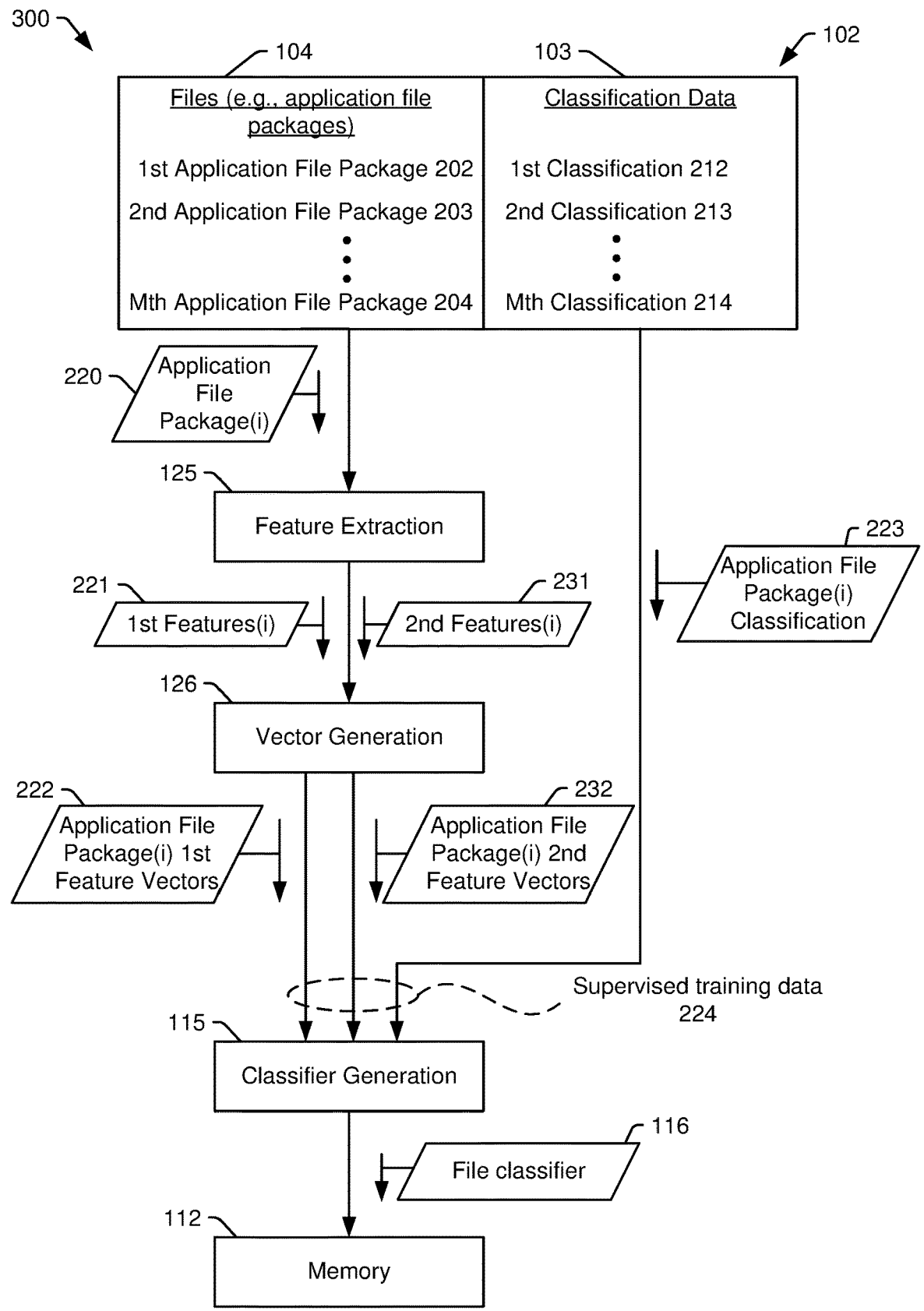
FIG. 3 illustrates a particular example of a process of generating a trained file classifier for malware detection.

FIG. 3 illustrates a particular example of a process 300 of generating a trained file classifier for malware detection. In FIG. 3, the application file packages 104 of the training data 102 include a first application file package 202, a second application file package 203, and one or more additional application file packages including an Mth application file package 204. The classification data 103 includes a classification associated with each of the application file packages 104. For example, a first classification 212 is associated with the first application file package 202, a second classification 213 is associated with the second application file package 203, and an Mth classification 214 is associated with the Mth application file package 204.

Figure 4:
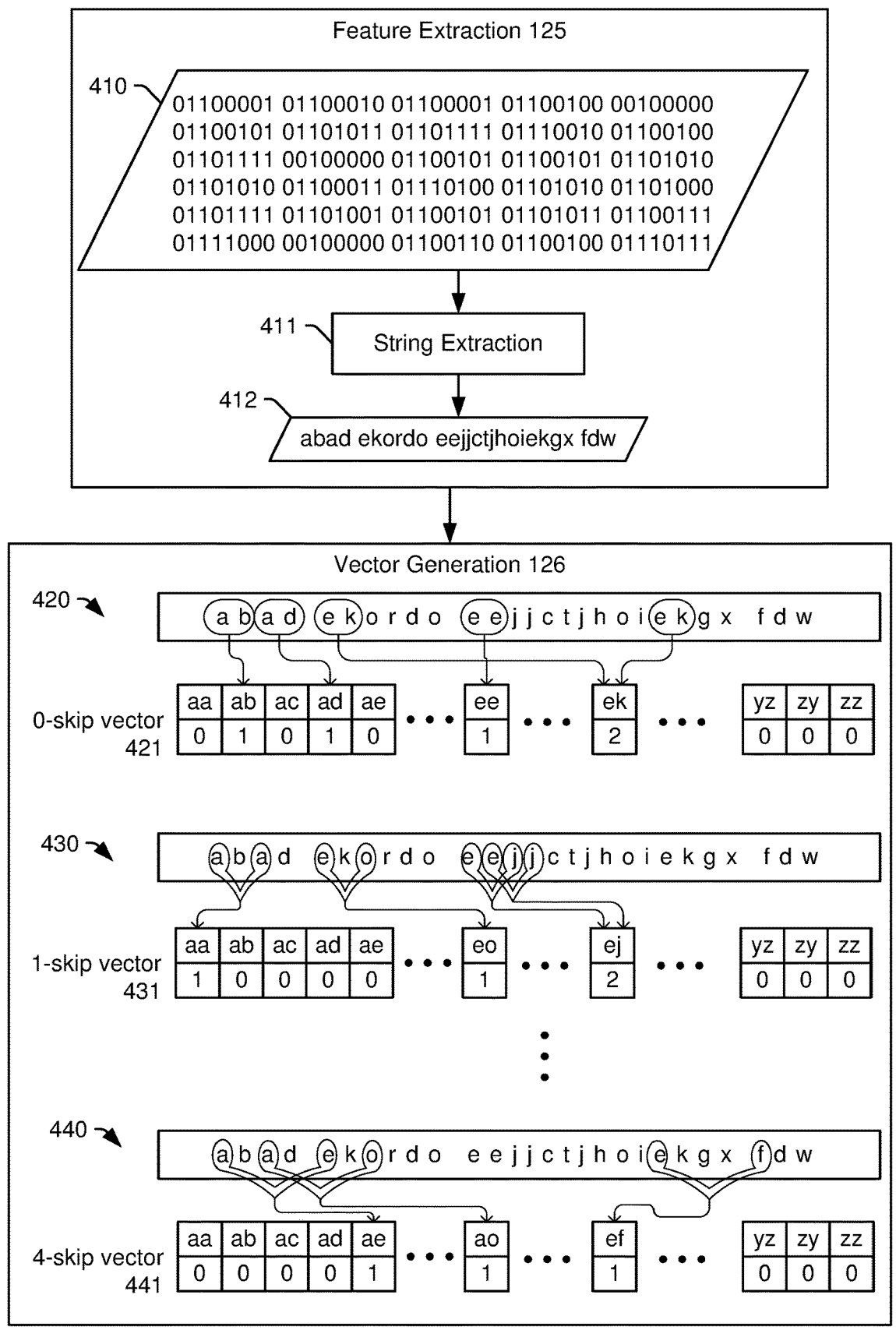
FIG. 4 illustrates a first particular example of feature extraction and vector generation to generate or use a trained file classifier for malware detection.

To generate the file classifier 116, one or more of the application file packages 104 is provided to the feature extraction instructions 125. For example, as illustrated in FIG. 3, an application file package 220 is provided to the feature extraction instructions 125 to generate first file features 221. The first file features 221 may include a set of characters (e.g., a string) representing binary values of a first subset of files of the application file package 220. For example, as described with reference to FIG. 4, the application file package 220 may include a binary file, and the feature extraction instructions 125 may convert the binary file into a set of alphanumeric characters, American Standard Code for Information Interchange (ASCII) characters, or Unicode characters. To illustrate, the feature extraction instructions 125 may perform a binary-to-ASCII conversion, using a utility such as the UNIX strings utility. In some examples, only particular characters or sets of characters are used to form the first file features 221. To illustrate, the first file features 221 may include only printable characters generated by the binary-to-ASCII conversion or only a subset of the printable characters generated by the binary-to-ASCII conversion (such as only lowercase letters and spaces, as illustrated in FIG. 4). Additionally, or in the alternative, the first file features 221 may omit groups of characters that are shorter than a threshold length, such as set of characters including fewer than four characters. In a particular implementation, the first file features 221 may include character n-grams, and a hash function may be applied to the character n-grams to generate a reduced character n-gram representation, as further described herein with reference to FIG. 5.

Figure 8:
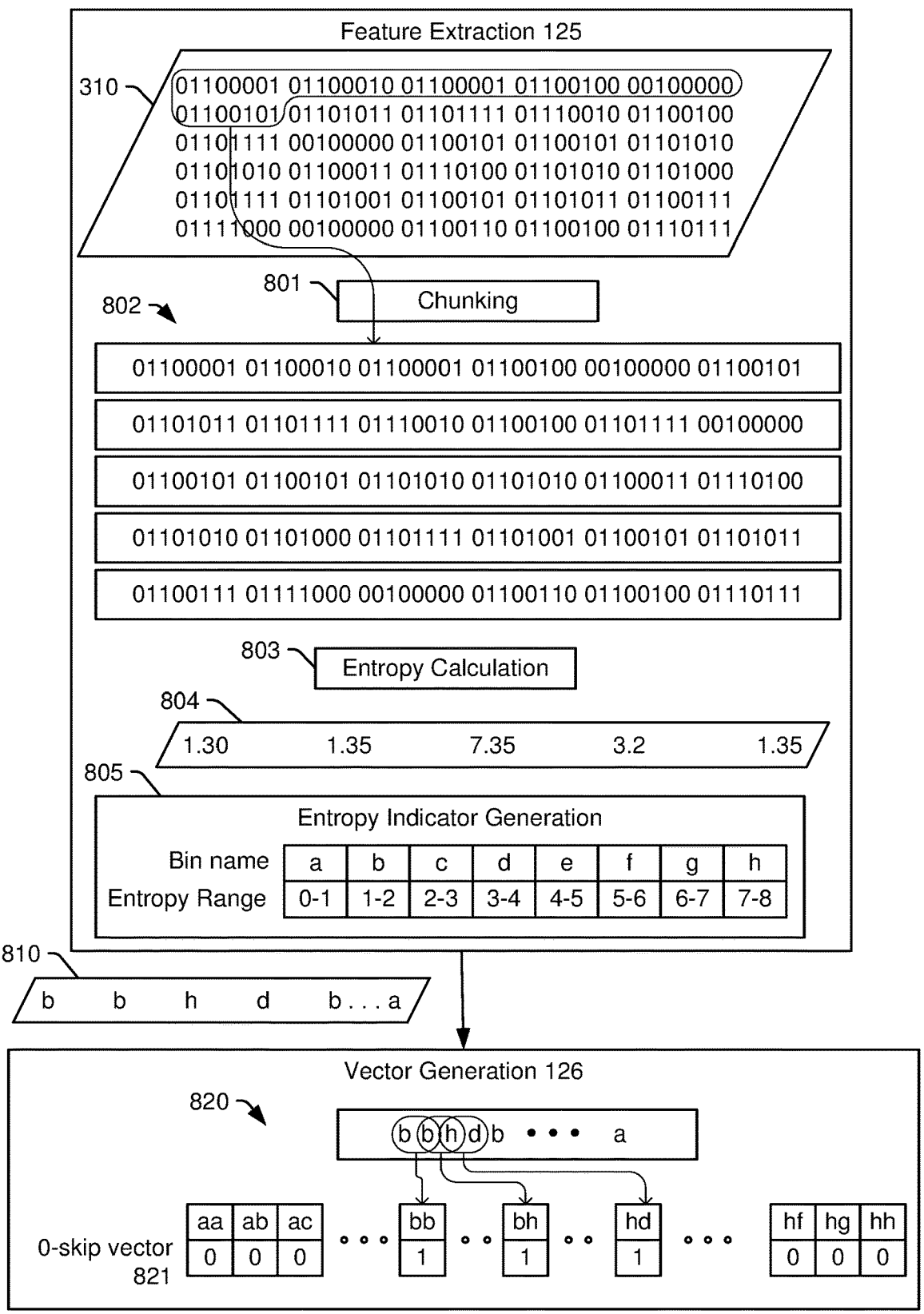
FIG. 8 illustrates a fifth particular example of feature extraction and vector generation to generate or use a trained file classifier for malware detection.

Instead of or in addition to converting the first subset of files of the application file package 220 into a set of alphanumeric characters, the feature extraction instructions 125 may generate the first file features 221 based on entropy information associated with the first subset of files of the application file package 220, as described further with reference to FIG. 8. For example, the application file package 220 may include a binary file, and the feature extraction instructions 125 may generate an entropy value for each block of a particular size of the binary file. The entropy values may be used to generate entropy indicators represented by, for example, alphanumeric characters. In this example, the first file features 221 provided to the vector generation instructions 126 include the entropy indicators.

In some examples, the feature extraction instructions 125 perform both string extraction and entropy indicator extraction. In such examples, the first file features 221 include the entropy indicators and sets of characters (e.g., printable ASCII characters).

The feature extraction instructions 125 also generate second file features 231 based on a second subset of files of the application file package 220. The second file features 231 may indicate the occurrence of attributes in the second subset of files of the application file package 220. For example, as described with reference to FIG. 6, the application file package 220 may include non-executable file, and the feature extraction instructions 125 may determine a number of attributes that occur in the non-executable file (e.g., the second subset of files of the application file package 220). In a particular implementation, the attributes include requests for system permissions, as further described with reference to FIG. 6. Additionally, or in the alternative, the attributes may include API class references, as further described with reference to FIG. 7. Thus, the second file features 231 may include indicators of requests for system permissions, indicators of API class references, or both the indicators of requests for system permissions and the indicators of API class references.

The vector generation instructions 126 are configured to generate one or more first feature vectors 222 representing n-grams of the first file features 221. In this context, an n-gram refers to sequence of n values in the first file features 221, where n is a positive integer greater than or equal to two. In some implementations, as described further below, the vector generation instructions 126 may generate more than one vector based on the first file features 221 of the application file package 220. In such implementations, the n-grams used to generate the vectors may include contiguous sequences of values (i.e., zero-skip grams), discontinuous sequences of values (i.e., skip grams), or both.

For example, as described in the example of FIG. 4, the first file features 221 may include printable characters representing the binary values of the first subset of files of the application file package 220, and the first feature vectors 222 may include values representing occurrence of n-grams (e.g., pairs when n=2, triplets when n=3, etc.) of printable characters of the first file features 221. The n-grams may represent adjacent printable characters within the first file features 221. Additionally, or in the alternative, the first feature vectors 222 may represent nonadjacent characters from the first file features 221. To illustrate, for a bi-gram (e.g., n=2), a pair of nonadjacent characters of the first file features 221 may include characters that are separated by at least one other character (e.g., a one-skip gram), at least two other characters (e.g., a two-skip gram), at least three other characters (e.g., a three-skip gram), at least four other characters (e.g., a four-skip gram), etc. In another example, the first feature vectors 222 may include n-grams of more than two characters, such as a three character n-gram (e.g., n=3).

In a particular implementation, the first feature vectors 222 include values representing occurrence of n-grams (e.g., pairs of characters, groups of characters, pairs of entropy indicators, or groups of entropy indicators) in the first file features 221. For example, as illustrated in greater detail in FIG. 4, a particular first feature vector may indicate occurrences of zero-skip bi-grams in the first file features 221. In this example, the particular first feature vector includes one field for each possible bi-gram (based on characters that are permitted to be included in the first file features 221). To illustrate, if the feature extraction instructions 125 generate the first file features 221 such that the first file features 221 include only lowercase English letters and spaces, then there are 27 distinct characters permitted in the first file features 221 (corresponding to a-z and a space character). Each bi-gram may include any of the 27 permitted characters as a first character and any of the 27 permitted characters as a second character. Thus, there are 27×27 (or 729) possible bi-grams based on the characters permitted in the first file features 221. In this example, each first feature vector may include 729 fields, each field indicating occurrence of a corresponding bi-gram.

In some implementations, a hash function may be applied to the possible character n-grams to generate a reduced character n-gram representation. The hash function may be selected to cause the reduced character n-gram representation to have a particular size. For example, if the first file features 221 include more features than just the lowercase English letters and spaces (e.g., uppercase English letters, numbers, other characters, etc.) such that there are more than 100,000 possible bi-grams a hash function may be applied to the >100,000 possible bi-grams to reduce generate a reduced character n-gram representation of 5,000 possible n-grams. For example, multiple possible n-grams may correspond to the same n-gram after application of the hashing function, thereby reducing the total number of possible n-grams. In this example, each first feature vector may include 5000 fields, each field indicating occurrence of a corresponding n-gram in the reduced character n-gram set.

In a particular implementation, the first feature vectors 222 include a Boolean vector (i.e., a vector of Boolean values). In this particular implementation, a value in each field is either a one (1) indicating that the n-gram appears in the first file features 221 (or that the n-gram appears in the reduced character n-gram representation based on the first file features 221) at least once or is a zero (0) indicating that the n-gram does not appear in the first file features 221. In another particular implementation, each field of the first feature vectors 222 represents a count of occurrences of the corresponding n-gram. In this particular implementation, the value in a particular field is a zero (0) indicating that the n-gram does not appear in the first file features 221 (or in the reduced character n-gram representation based on the first file features 221), or is an integer indicating the number of times that the n-gram appears in the first file features 221 (or in the reduced character n-gram representation based on the first file features 221).

Additionally, the vector generation instructions 126 are configured to generate one or more second feature vectors 232 representing occurrences of attributes in the second file features 231. The attributes may include requests for system permissions, API class references, or both. The second feature vectors 232 indicate whether each attribute of a particular group of attributes is included in the second file features 231.

In a particular implementation, the second feature vectors 232 include a Boolean vector. In this particular implementation, a value in each field is either a one (1) indicating that an attribute appears in the second file features 231 at least once or is a zero (0) indicating that the attribute does not appear in the second file features 231. In another particular implementation, each field of the second feature vectors 232 represents a count of occurrences of the corresponding attribute. In this particular implementation, the value in a particular field is a zero (0) indicating that the attribute does not appear in the second file features 231, or is an integer indicating the number of times that the attribute appears in the second file features 231.

In a particular implementation, each field of the second feature vectors 232 (or a subset of the second feature vectors 232) indicate whether a corresponding system permission of a particular group of system permissions is requested. As a particular example, the second feature vectors 232 may include 139 elements indicating whether a request for each system permission of a group of 139 system permissions is included in the second file features 231. In a particular implementation, the elements of the second feature vectors 232 represent all available system permissions associated with an operation system or platform. In another particular implementation, each field of the second feature vectors 232 (or a subset of the second feature vectors 232) indicates whether an API class reference of a group of API class references is present. As a particular example, the second feature vectors 232 may include 900 elements indicating whether an API class reference of a group of 900 API class references is included in the second file features 231. In a particular implementation, the elements of the second feature vectors 232 represent all possible API class references associated with an operation system or platform. Although 139 system permissions and 900 API class references are described, such values are not limiting, and the second feature vectors 232 may include elements corresponding to more than or fewer than 139 system permissions and more than or fewer than 900 API class references. In some implementations, a first vector (or a first subset of elements) of the second feature vectors 232 may correspond to system permissions, and a second vector (or a second subset of elements) of the second feature vectors 232 may correspond to API class references. Other vectors (or other subsets of elements) may correspond to other attributes, such as Linux commands that are included in byte code or the presences of application file package "receivers", as further described herein.

In some implementations, the vector generation instructions 126 generate more than one feature vector corresponding to the first feature vectors 222, more than one feature vector corresponding to the second feature vectors 232, or both, for each application file package. For example, the vector generation instructions 126 may generate a feature vector based on adjacent characters (e.g., zero-skip n-grams) of the first file features 221 and may generate one or more other feature vectors based on non-adjacent characters (e.g., skip n-grams) of the first file features 221. To illustrate, the vector generation instructions 126 may generate a first feature vector based on zero-skip bi-grams (e.g., adjacent pairs of characters) of the first file features 221, may generate a second feature vector based on one-skip bi-grams (e.g., pairs of characters with one intervening character) of the first file features 221, may generate a third feature vector based on two-skip bi-grams (e.g., pairs of characters with two intervening character) of the first file features 221, may generate a fourth feature vector based on three-skip bi-grams (e.g., pairs of characters with three intervening character) of the first file features 221, may generate a fifth feature vector based on four-skip bi-grams (e.g., pairs of characters with four intervening character) of the first file features 221, and may generate a sixth feature vector based on occurrences of attributes in the second file features 231. In this example, the first, second, third, fourth, fifth, and sixth feature vectors may be concatenated to form a single feature vector provided with the application file package classification 223 of the application file package 220 as part of the supervised training data 224. In other examples, more than or fewer than six feature vectors based on different skip grams and different attributes may be used. Additionally, or in the alternative, one or more feature vectors based on n-grams of entropy indicators may be combined with (e.g., concatenated with) one or more feature vectors based on n-grams of printable characters and one or more feature vectors based on attributes as part of the supervised training data 224.

The classifier generation instructions 115 use the supervised training data 224 to generate the file classifier 116. For example, the classifier generation instructions 115 may utilize an automated neural network building process, a support vector machine building process, a gradient descent boosting decision tree building process, or another process to build the file classifier 116 using a machine learning technique. The file classifier 116 (or data describing the file classifier 116) may be stored at the memory 152. Additionally, the file classifier 116 may be provided to other computing devices, such as the second computing device 120 of FIG. 1, the second computing device 120 of FIG. 2, or both. Although FIG. 3 has described operations of the feature extraction instructions 125 and the vector generation instructions 126, the feature extraction instructions 113 of FIGS. 1 and 2 and the vector generation instructions 114 of FIGS. 1 and 2 may perform the same operations as the feature extraction instructions 125 and the vector generation instructions 126, respectively.

As described with reference to FIG. 3, features may be extracted from (e.g., feature data may be generated based on) a subset of files of an application file package in order to generate a file classier. Processing the subset of files of the application file package to generate the feature data may reduce the time and computer resources used to generate the file classifier as compared to processing all of the files of the application file package to generate the feature data. In other implementations, each file of the application file package may be processed to generate the feature data. In some implementations, feature extraction instructions 125, the vector generation instructions 126, and the classifier generation instructions 115 may be executed to generate the file classifier 116 by one or more graphics processing units (GPUs). In such implementations, fewer features may be extracted from each application file package due to the GPUs having smaller memories than other processing units. For example, has functions may be applied to character n-grams to further reduce the character n-gram representation, thereby reducing size of feature vectors. Additionally or alternatively, fewer files (or portions of files) of the application file package may be processed to generate character n-grams, may analyzed to determine occurrences of attributes, or both.

FIG. 4 illustrates a first particular example of operations performed by the feature extraction instructions 125 and the vector generation instructions 126. In particular, FIG. 4 illustrates generating file features by converting a binary file 410 (e.g., an executable file of the first subset of files 132 of the application file package 128) into a set of characters, and generating multiple feature vectors based on n-grams of the file features. As explained with reference to FIGS. 1 and 2, the feature extraction instructions 113 and the vector generation instructions 114 may perform the same operations as the feature extraction instructions 125 and the vector generation instructions 126 on one or more files of an application file package to be tested for malware.

In FIG. 4, the feature extraction instructions 125 receive the binary file 410. The binary file 410 may include an executable file, such as a binary file of the application file package 128 of FIGS. 1 and 2. The feature extraction instructions 125 include string extraction instructions 411. The string extraction instructions 411 are configured to determine a set of characters 412 based on the binary file 410. For example, the string extraction instructions 411 may include or correspond to a UNIX strings utility, and the set of characters 412 may include ASCII characters represented by portions of the binary file. In a particular implementation, only a subset of ASCII characters is allowed in the set of characters 412. For example, the string extraction instructions 411 may generate only lowercase English letters, only uppercase English letters, only letters and numbers, or only printable ASCII characters. In the particular example illustrated in FIG. 4, the set of characters 412 includes only lowercase English letters and spaces represented by the binary file 410. Thus, in the example illustrated in FIG. 4, the set of characters 412 is a string of printable characters.

The feature extraction instructions 125 may provide the set of characters 412 to the vector generation instructions 126. In the particular example illustrated in FIG. 4, the vector generation instructions 126 illustrate generation of a first vector based on zero-skip bi-grams, generation of a second vector based on one-skip bi-grams, and generation of a third vector based on four-skip bi-grams. In other implementations, similar processes may be used to generate vectors based on bi-grams with different skip values (e.g., a two-skip bi-gram), vectors based on n-grams with a different value of n (e.g., tri-grams, where n=3), or a combination thereof (e.g., a vector based on a zero-skip tri-gram, a vector based on a one-skip tri-gram, etc.).

A first operation 420 illustrates forming a first vector (e.g., zero-skip vector 421) based on zero-skip bi-grams of the set of characters 412. Because the zero-skip vector 421 is based on zero-skip grams, each value of the zero-skip vector 421 represents a contiguous or adjacent group of characters. Further, since the zero-skip vector 421 is based on bi-grams, each of the contiguous or adjacent group of characters includes two characters. Thus, each value of the zero-skip vector 421 represents occurrence of a particular pair of adjacent characters in the set of characters 412. In particular, in FIG. 4, each zero value of the zero-skip vector 421 indicates that a corresponding pair of adjacent characters does not occur in the set of characters 412. To illustrate, a value of zero in a first field (corresponding to the bi-gram "aa") of the zero-skip vector 421 indicates that no character "a" is adjacent to another character "a" in the set of characters 412. Also in FIG. 4, each non-zero value of the zero-skip vector 421 indicates that a corresponding pair of adjacent characters does occur in the set of characters 412. To illustrate, a value of one in a second field (corresponding to the bi-gram "ab") of the zero-skip vector 421 indicates that at least one character "a" is adjacent to (e.g., immediately precedes) a character "b" in the set of characters 412. In the particular implementation illustrated in FIG. 4, each field of the zero-skip vector 421 represents a count of occurrences of the corresponding bi-gram. Thus, in this implementation, the value of one in the second field (corresponding to the bi-gram "ab") of the zero-skip vector 421, indicates that the bi-gram "ab" occurs once in the set of characters. Similarly, in this implementation, the value of two in the field corresponding to the bi-gram "ek" indicates that the bi-gram "ek" occurs twice in the set of characters. In other implementations, the vector generation instructions 126 generate Boolean vectors. In such implementations, the value of each field is either a zero indicating that the corresponding bi-gram does not occur in the set of characters 412, or is a one indicating that the corresponding bi-gram occur at least once in the set of characters 412.

The zero-skip vector 421 has a length (e.g., a number of fields) corresponding to a number of possible bi-grams that could occur in the set of characters 412. Stated another way, the length of the zero-skip vector 421 is equal to P×P, where P is a count of distinct characters that the string extraction instructions 411 are allowed to generate. To illustrate, as explained above, in the example illustrated in FIG. 4, the string extraction instructions 411 are configured to extract only lowercase English letters and spaces. Accordingly, the count of distinct characters that the string extraction instructions 411 are allowed to generate equals 27, so P×P equals 27×27 or 729. Thus, in this example, the zero-skip vector 421 has a length of 729 fields, with each field corresponding to a particular bi-gram, and the entire set of 729 fields representing every possible bi-gram based on the distinct characters generated by the string extraction instructions 411. If the string extraction instructions 411 are allowed to extract more distinct characters, then the zero-skip vector 421 will be longer. For example, if the string extraction instructions 411 are allowed to extract as lower case English letters (26 distinct characters), numbers (10 distinct characters), and spaces (1 distinct character), then P=26+10+1, or 37 and P×P=37×37, or 1369 fields.

A second operation 430 of FIG. 4 illustrates forming a second vector (e.g., one-skip vector 431) based on one-skip bi-grams of the set of characters 412. Because the one-skip vector 431 is based on one-skip grams, each value of the one-skip vector 431 represents a non-adjacent group of characters (e.g., two characters with one character between them). Further, since the one-skip vector 431 is based on bi-grams, each non-adjacent group of characters includes two characters. Thus, each value of the one-skip vector 431 represents occurrence of a particular pair of characters separated in the set of characters 412 by one other character. In FIG. 4, each zero value of the one-skip vector 431 indicates that a corresponding pair of characters separated by one other character does not occur in the set of characters 412. To illustrate, a value of zero in a second field (corresponding to the bi-gram "ab") of the one-skip vector 431 indicates that within the set of characters 412, no character "a" is separated from a character "b" by one intervening character. Also in FIG. 4, each non-zero value of the zero-skip vector 421 indicates that a corresponding pair of characters does occur in the set of characters 412 with one intervening character. To illustrate, a value of one in a first field (corresponding to the bi-gram "aa") of the one-skip vector 431 indicates that at least one character "a" precedes a character "a" in the set of characters 412 with one character between them. In the particular implementation illustrated in FIG. 4, each field of the one-skip vector 431 represents a count of occurrences of the corresponding bi-gram. Thus, in this implementation, the value of one in the first field (corresponding to the bi-gram "aa") of the one-skip vector 431, indicates that the one-skip bi-gram "aa" occurs once in the set of characters 412. Similarly, in this implementation, the value of two in the field corresponding to the one-skip bi-gram "ej" indicates that the one-skip bi-gram "ej" occurs twice in the set of characters 412. As explained above, in other implementations, the vector generation instructions 126 generate Boolean vectors rather than vectors based on counts of each bi-gram.

Since the one-skip vector 431 and the zero-skip vector 421 are both based on bi-grams of the set of characters 412, the one-skip vector 431 and the zero-skip vector 421 have the same length. Thus, the length of the one-skip vector 431 is P×P, as explained above with reference to the zero-skip vector 421.

A third operation 440 of FIG. 4 illustrates forming a third vector (e.g., four-skip vector 441) based on four-skip bi-grams of the set of characters 412. Because the four-skip vector 441 is based on four-skip grams, each value of the four-skip vector 441 represents a non-adjacent group of characters (e.g., two characters with four characters between them). Further, since the four-skip vector 441 is based on bi-grams, each non-adjacent group of characters includes two characters. Thus, each value of the four-skip vector 441 represents occurrence of a particular pair of characters separated in the set of characters 412 by four other character. Since the four-skip vector 441 is based on bi-grams, the four-skip vector 441 has the same length as the zero-skip vector 421 and the one-skip vector 431.

The vector generation instructions 126 may generate a single n-gram vector, such as the zero-skip vector 421 or may generate a set of n-gram vectors, such as the zero-skip vector 421, the one-skip vector 431, a two-skip vector (not shown), a three-skip vector (not shown), and the four-skip vector 441. Using multiple different skip grams (e.g., a zero-skip gram, a one-skip gram, a two-skip gram, a three-skip gram, and a four-skip gram) enable the vector generation instructions 126 to generate vectors that retain information about context of particular characters while constraining an overall size of the input data. For example, the length of each vector is fixed and known, as explained above. Thus, information about context of character pairs, such as presence of particular words or other patterns is retained without the use of a dictionary or other pattern information related to potential patterns within strings.

Figure 5:
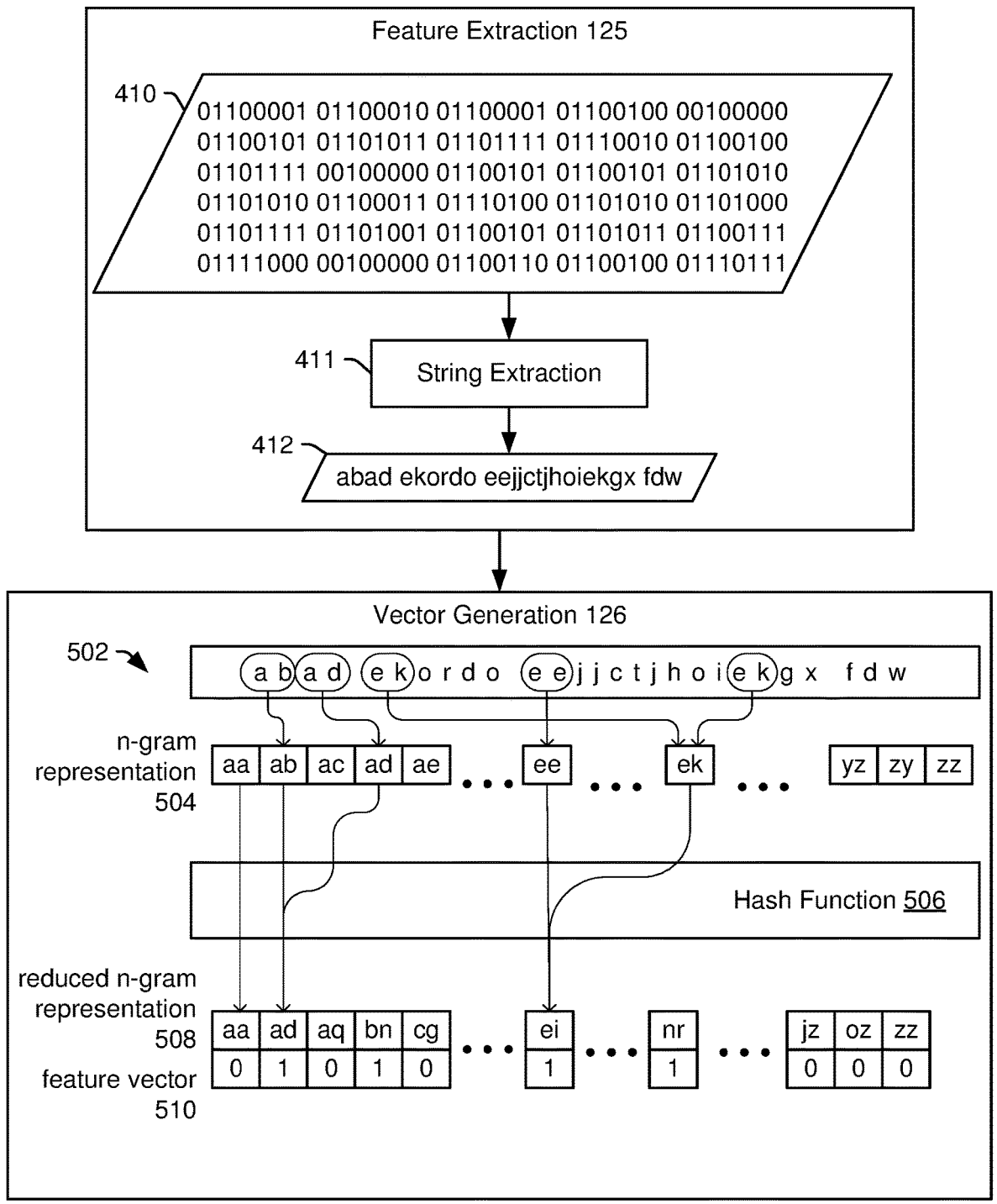
FIG. 5 illustrates a second particular example of feature extraction and vector generation to generate or use a trained file classifier for malware detection.

FIG. 5 illustrates a second particular example of operations performed by the feature extraction instructions 125 and the vector generation instructions 126. In particular, FIG. 5 illustrates generating file features by converting a binary file 410 (e.g., an executable file of the first subset of files 132 of the application file package 128) into a set of characters, and generating multiple feature vectors based on n-grams of the file features. As explained with reference to FIGS. 1 and 2, the feature extraction instructions 113 and the vector generation instructions 114 may perform the same operations as the feature extraction instructions 125 and the vector generation instructions 126 on one or more files of an application file package to be tested for malware.

In FIG. 5, the feature extraction instructions 125 receive the binary file 410. The binary file 410 may include an executable file, such as a binary file of the application file package 128 of FIGS. 1 and 2. The feature extraction instructions 125 include the string extraction instructions 411 that are configured to determine the set of characters 412 based on the binary file 410, as described with reference to FIG. 4. For example, the string extraction instructions 411 may include or correspond to a UNIX strings utility, and the set of characters 412 may include ASCII characters represented by portions of the binary file. In a particular implementation, only a subset of ASCII characters is allowed in the set of characters 412. For example, the string extraction instructions 411 may generate only lowercase English letters, only uppercase English letters, only letters and numbers, or only printable ASCII characters. In the particular example illustrated in FIG. 4, the set of characters 412 includes only lowercase English letters and spaces represented by the binary file 410. Thus, in the example illustrated in FIG. 5, the set of characters 412 is a string of printable characters.

The feature extraction instructions 125 may provide the set of characters 412 to the vector generation instructions 126. In the particular example illustrated in FIG. 5, the vector generation instructions 126 illustrate generation of a first vector based on zero-skip bi-grams. In other implementations, similar processes may be used to generate vectors based on bi-grams with different skip values (e.g., a two-skip bi-gram), vectors based on n-grams with a different value of n (e.g., tri-grams, where n=3), or a combination thereof (e.g., a vector based on a zero-skip tri-gram, a vector based on a one-skip tri-gram, etc.).

A first operation 502 illustrates forming a first feature vector 510 based on zero-skip bi-grams of the set of characters 412. Because the zero-skip grams are used, a character n-gram representation 504 corresponds to a set of possible bi-grams included in the set of characters 412. A hash function 506 is applied to the character n-gram representation 504 (e.g., the set of possible bi-grams) to generate a reduced character n-gram representation 508. The hash function 506 may map character n-grams of the character n-gram representation 504 (e.g., a dataset having a first size) to character n-grams of the reduced character n-gram representation 508 (e.g., a dataset having a second size). The hash function 506 may be selected such that the second size is smaller than the first size (e.g., there are fewer character n-grams in the reduced character n-gram representation 508 than in the character n-gram representation 504). In a particular implementation, the character n-grams of the character n-gram representation 504 are converted into numerical values prior to application of the hash function 506 (and output numerical values of the hash function 506.

In a particular implementation, the reduced character n-gram representation 508 has a smaller size than the character n-gram representation 504 because, for at least some character n-grams, the hash function 506 maps multiple character n-grams of the character n-gram representation 504 to a single corresponding character n-gram of the reduced character n-gram representation 508. To illustrate, some character n-grams (e.g., bi-grams) in the reduced character n-gram representation 508 may correspond to multiple character n-grams in the character n-gram representation 504. As an example, the bi-grams "ab" and "ad" in the character n-gram representation 504 may correspond to the bi-gram "ad" in the reduced character n-gram representation 508. As another example, the bi-grams "ee" and "ek" in the character n-gram representation 504 may correspond to the bi-gram "ei" in the reduced character n-gram representation 508.

The first feature vector 510 indicates occurrences of character n-grams in the reduced character n-gram representation 508. In a particular implementation, the first feature vector 510 includes a Boolean vector, and a value of each element of the Boolean vector represents occurrence a corresponding character n-gram in the reduced character n-gram representation 508. In particular, in FIG. 5, each zero value of the first feature vector 510 indicates that a corresponding pair of adjacent characters (e.g., a character n-gram) does not occur in the reduced character n-gram representation 508. To illustrate, a value of zero in a first field (corresponding to the bi-gram "aa") of the first feature vector 510 indicates that the bi-gram "aa" is not represented in the reduced character n-gram representation 508. Also in FIG. 5, each non-zero value of the first feature vector 510 indicates that a corresponding pair of adjacent characters (e.g., a character n-gram) does occur in the reduced character n-gram representation 508. To illustrate, a value of one in a second field (corresponding to the bi-gram "ad") of the first feature vector 510 indicates that the bi-gram "ad" is represented at least once in the reduced set of characters. In other implementations, each field of the first feature vector 510 represents a count of occurrences of the corresponding character n-gram.

The first feature vector 510 has a length (e.g., a number of fields) corresponding to a number of possible character n-grams that could occur in the reduced character n-gram representation 508. Because the reduced character n-gram representation 508 includes fewer character n-grams than the character n-gram representation 504, the first feature vector 510 has a length that is less than a feature vector generated based on the character n-gram representation 504. As a particular example, the character n-gram representation 504 may include 100,000 (or more) character n-grams, and the first feature vector 510 may have a size of 5000 (e.g., the hash function 506 may map the 100,000 character n-grams to 5000 character n-grams). Reducing the size of the first feature vector 510 may enable generation of file classifiers at computing devices having reduced processing resources, memory resources, or both, as compared to computing devices that are capable of processing feature vectors having larger sizes. In a particular implementation, the vector generation instructions 126 may select a particular hash function to use based on computing and memory resources of a computing system. For example, a plurality of hash functions corresponding to different feature vector sizes may be accessible, and the vector generation instructions 126 may cause selection of a particular hash function based on the computing and memory resources. To illustrate, based on available computing and memory resources, a particular hash function may be selected from among the hash function 506 (that corresponds to a 5000 element feature vector), a second hash function (that corresponds to a 10000 element feature vector), a third hash function (that corresponds to a 100000 element feature vector), or other hash functions.

Although zero-skip bi-grams are illustrated in FIG. 5, in other implementations, the character n-grams may include n-grams that skip one or more values (e.g., one-skip grams, two-skip grams, etc.), character n-grams that include more than two characters (e.g., tri-grams, quad-grams, etc.), or both. Although the hash function 506 is described as being applied to the character n-gram representation 504, in other implementations, the hash function 506 may be applied to the set of characters 412 to generate a reduced set of characters, and the reduced character n-gram representation corresponds to a character n-gram representation based on the reduced set of characters. Thus, the hash function 506 may be applied at various points during feature extraction or vector generation.

Figure 6:
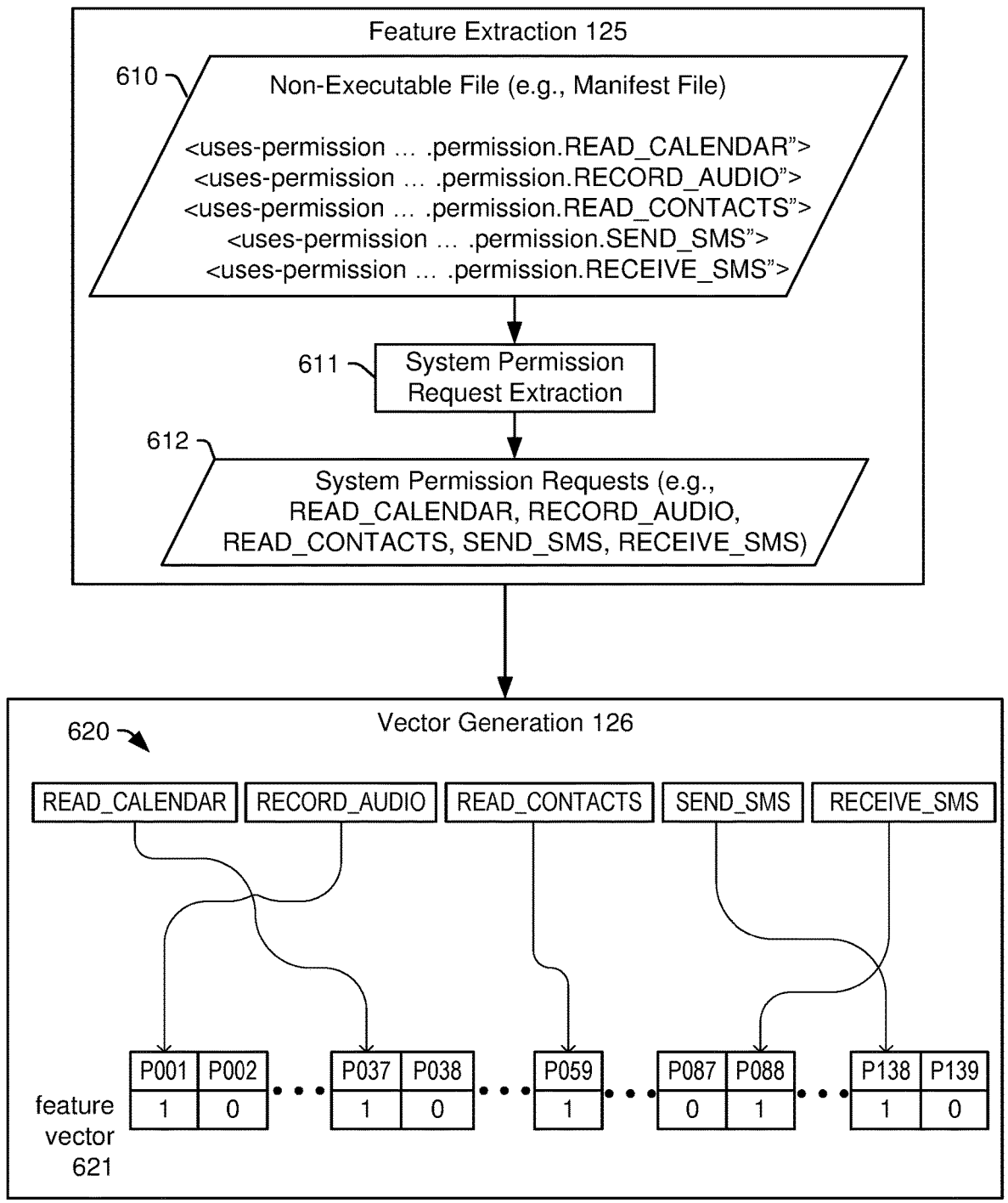
FIG. 6 illustrates a third particular example of feature extraction and vector generation to generate or use a trained file classifier for malware detection.

FIG. 6 illustrates a third particular example of operations performed by the feature extraction instructions 125 and the vector generation instructions 126. In particular, FIG. 6 illustrates generating file features by analyzing one or more non-executable files of an application file package to identify occurrences of requests for system permissions (e.g., occurrences of attributes), and generating multiple file vectors based on the occurrences of the attributes. The one or more non-executable files may correspond to a subset of files of an application file package, such as the second subset of files 133 of the application file package 128 of FIG. 1. As explained with reference to FIGS. 1 and 2, the feature extraction instructions 113 and the vector generation instructions 114 may perform the same operations as the feature extraction instructions 125 and the vector generation instructions 126 on one or more files of an application file package to be tested for malware.

In FIG. 6, the feature extraction instructions 125 receive a non-executable file 610 of the application file package 128 of FIGS. 1 and 2. The non-executable file 610 may include text (or may be processed to generate a text representation). In a particular implementation, the non-executable file 610 includes a manifest file. The non-executable file 610 may also include or correspond to a compiled resource file, another non-executable file, or a combination thereof. The feature extraction instructions 125 include system permission request extraction instructions 611. The system permission request extraction instructions 611 are configured to analyze the non-executable file 610 and to determine requests for system permissions included in the non-executable file 610. In a particular implementation, the system permission request extraction instructions 611 are configured to convert the non-executable file 610 from a first file type to a text file (or other file type) that is capable of being analyzed to detect requests for system permissions.

System permissions, as used herein, refer to system data, features, and capabilities of a computing device that executes an application file package. To illustrate, an application may be isolated from other applications and from the system (e.g., the computing device) that executes the application. To access data or resources that are outside the application (e.g., that are outside a "process sandbox" in which the application is executed), the application may request system permissions corresponding to data or resources that are outside the purview of the application. For example, system permissions associated with a computing device, such as a mobile device, may include permissions to access a calendar, a camera, a contacts list, location data, a microphone, phone data and features (e.g., using the phone to make or receive a phone call, accessing a call log, accessing voice mail, etc.), sensors and sensor data, short messaging service (SMS) data and features (e.g., causing the computing device to send or receive a SMS message, accessing received SMS messages, etc.), external storage (e.g., memory cards, etc.), other system permissions, or a combination thereof, as non-limiting examples.

The system permission request extraction instructions 611 are configured to determine which (if any) system permissions are requested in the non-executable file 610. In the particular example of FIG. 6, the non-executable file 610 (e.g., the manifest file) includes information that includes requests for system permissions READ_CALENDAR, RECORD_AUDIO, READ_CONTACTS, SEND_SMS, and RECEIVE_SMS. The particular system permissions requested are for illustrative purposes and are not intended to be limiting. In other examples, more than five or fewer than five system permissions may be requested, and different system permissions may be requested. Thus, the system permission request extraction instructions 611 may generate a set of system permission requests 612 that include READ_CALENDAR, RECORD_AUDIO, READ_CONTACTS, SEND_SMS, and RECEIVE_SMS.

The feature extraction instructions 125 may provide the set of system permission requests 612 to the vector generation instructions 126. A first operation 620 illustrates forming a feature vector 621 based on the set of system permission requests 612. Each value of the feature vector 621 represents occurrence of a request for the corresponding system permission in the set of system permission requests 612. In a particular implementation, the feature vector 621 includes a Boolean vector indicating whether each system permission of a group of system permissions is indicated by the set of system permission requests 612. To illustrate, in FIG. 6, each zero value in the feature vector 621 indicates that a corresponding system permission request does not occur in the set of system permission requests 612, and each one value in the feature vector 621 indicates that a corresponding system permission request occurs in the set of system permission requests 612. As a particular example, a value of one in the first field (the "P001" field) indicates that the corresponding system permission request, the request for RECORD_AUDIO, occurs in the set of system permission requests 612. In other implementations, the non-executable file 610 includes a plurality of files, and values of the feature vector 621 indicate a number of occurrences of the corresponding system permission request in the plurality of files.

The feature vector 621 has a size that is based on the group of system permission requests compared to the set of system permission requests 612. For example, the group of system permission requests may be a particular group of system permission requests that have a high correlation to presence of malware in application file packages. As another example, the group of system permissions includes the group of all possible system permissions associated with a computing device or operating system that executes the application file package. In the particular example of FIG. 6, the feature vector 621 includes 139 elements, and thus the feature vector 621 indicates whether each of 139 system permissions requests are included in the set of system permission requests 612. In other examples, the feature vector 621 includes fewer than 139 or more than 139 elements.

Figure 7:
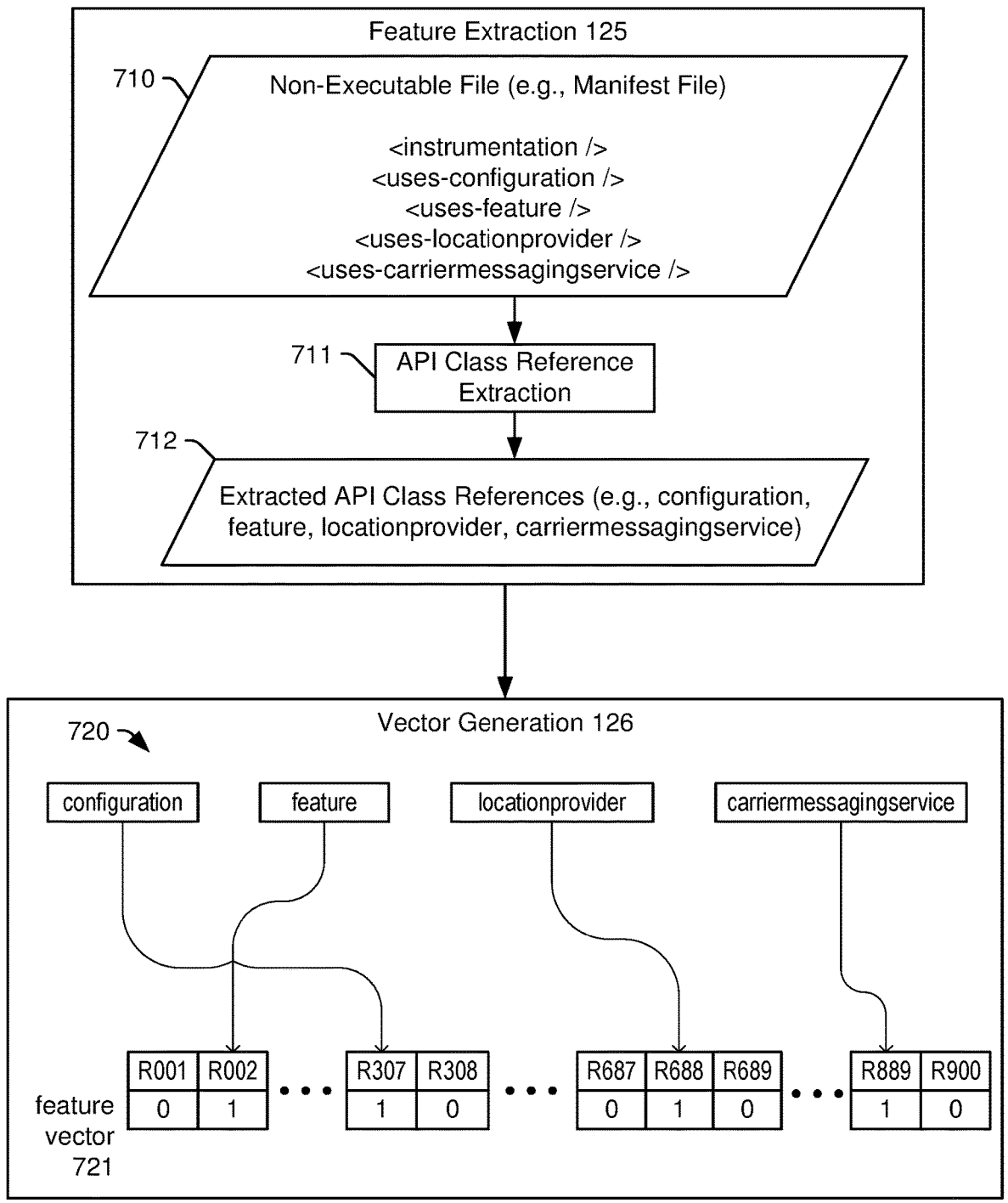
FIG. 7 illustrates a fourth particular example of feature extraction and vector generation to generate or use a trained file classifier for malware detection.

FIG. 7 illustrates a fourth particular example of operations performed by the feature extraction instructions 125 and the vector generation instructions 126. In particular, FIG. 7 illustrates generating file features by analyzing one or more non-executable files of an application file package to identify occurrences of references to API classes (e.g., occurrences of attributes), and generating multiple file vectors based on the occurrences of the attributes. The one or more non-executable files may correspond to a subset of files of an application file package, such as the second subset of files 133 of the application file package 128 of FIG. 1. As explained with reference to FIGS. 1 and 2, the feature extraction instructions 113 and the vector generation instructions 114 may perform the same operations as the feature extraction instructions 125 and the vector generation instructions 126 on one or more files of an application file package to be tested for malware.

In FIG. 7, the feature extraction instructions 125 receive a non-executable file 610 of the application file package 128 of FIGS. 1 and 2. The non-executable file 610 may include text (or may be processed to generate a text representation). In a particular implementation, the non-executable file 610 includes a manifest file. The non-executable file 610 may also include or correspond to a compiled resource file, another non-executable file, or a combination thereof. The feature extraction instructions 125 include API class reference extraction instructions 711. The API class reference extraction instructions 711 are configured to analyze the non-executable file 610 and to determine API class references included in the non-executable file 610. In a particular implementation, the API class reference extraction instructions 711 are configured to convert the non-executable file 610 from a first file type to a text file (or other file type) that is capable of being analyzed to detect API class references.

Non-executable files, such as manifest files, may include references to API classes to access routines, data structures, object classes, variables, remote calls, or other data or information that has been generated and associated with a particular API. API classes may include Android API classes, Java® API classes (Java is a registered trademark of Sun Microsystems, Inc.), C++ API classes, API classes associated with other operating systems or operating platforms, other API classes, or a combination thereof. The API class reference extraction instructions 711 are configured to determine which (if any) API class references are indicated by the non-executable file 610. In the particular example of FIG. 7, the non-executable file 610 (e.g., the manifest file) includes information that includes a first API class reference ("uses-configuration l"), a second API class reference ("uses-feature /"), a third API class reference ("uses-locationprovider /"), and a fourth API class reference ("uses-carriermessagingservice /"). The particular API class references are provided for illustrative purposes and are not intended to be limiting. In other examples, more than four or fewer than four API classes may be referenced, and different API classes may be referenced. Thus, the API class reference extraction instructions 711 may generate a set of API class references 712 that include configuration, feature, locationprovider, and carriermessagingservice.

The feature extraction instructions 125 may provide the set of API class references 712 to the vector generation instructions 126. A first operation 720 illustrates forming a feature vector 721 based on the set of API class references 712. Each value of the feature vector 721 represents occurrence of a corresponding API class reference in the set of API class references 712. In a particular implementation, the feature vector 721 includes a Boolean vector indicating whether each API class reference of a group of API class references is indicated by the set of API class references 712. To illustrate, in FIG. 7, each zero value in the feature vector 721 indicates that a corresponding API class reference does not occur in the set of API class references 712, and each one value in the feature vector 721 indicates that a corresponding API class reference occurs in the set of API class references 712. As a particular example, a value of one in the second field (the "R002" field) indicates that the corresponding API class reference, the reference to the feature API class, occurs in the set of API class references 712. In other implementations, the non-executable file 610 includes a plurality of files, and values of the feature vector 721 indicate a number of occurrences of the corresponding API class reference in the plurality of files.

The feature vector 721 has a size that is based on the group of API class references compared to the set of API class references 712. For example, the group of API class references may be a particular group of API class references that have a high correlation to the presence of malware in application file packages. As another example, the group of API class references includes the group of all possible API class references associated with a computing device or operating system that executes the application file package. In the particular example of FIG. 7, the feature vector 721 includes 900 elements, and thus the feature vector 721 indicates whether each of 900 API class references are included in the set of API class references 712. In other examples, the feature vector 721 includes fewer than 900 or greater than 900 elements.

In other implementations, the feature extraction instructions 125 and the vector generation instructions 126 may be configured to generate feature vectors based on other attributes included in one or more files of an application file package. As a particular example, the one or more files may be analyzed for the presence of Linux commands in byte code contained within the one or more files. To illustrate, a feature vector may be generated that indicates whether each Linux command of a group of Linux commands occurs in byte code of the one or more files. The group of Linux commands may include a group of Linux commands that have a high correlation to the presence of malware in application file packages, or to some other group of Linux commands. As another particular example, the one or more files may be analyzed for the presence of a "receiver". A receiver enables a particular application to receive information that is broadcast by the system or other applications, even when the particular application (or components thereof) are not running Receivers may be declared in a manifest file or created dynamically with code and registered using a particular reference. The feature extraction instructions 125 may be configured to analyze the one or more files (e.g., the manifest file or other files) for occurrence of a declaration of a receiver (or a reference associated with dynamically creating the receiver). The feature vector may be generated that indicates whether each receiver of a group of receivers is present in the one or more files. These additional feature vectors may be provided to a file classifier for training, and new application package files may be analyzed to extract the additional features as part of a malware identification process.

FIG. 8 illustrates a fifth particular example of operations performed by the feature extraction instructions 125 and the vector generation instructions 126. In particular, FIG. 8 illustrates generating entropy indicators as file features and generating one or more feature vectors based on n-grams of the entropy indicators. As explained with reference to FIGS. 1 and 2, the feature extraction instructions 113 and the vector generation instructions 114 may perform the same operations as the feature extraction instructions 125 and the vector generation instructions 126 on one or more files of an application file package to be tested for malware.

In FIG. 8, the feature extraction instructions 125 receive the binary file 410. The binary file 410 may include an executable file, such as a binary file of the application file package 128 of FIGS. 1 and 2. The binary file 410 is divided into chunks via chunking instructions 801. For example, the binary file 410 may be divided into chunks of 256 bytes each. In other examples, different chunk sizes may be used.

When the binary file 412 has a length that is not divisible by 256 bytes without a remainder, the remainder is maybe dropped. While the chunks 802 are illustrated in FIG. 8 in binary form, in other implementations, the chunking instructions 801 may convert the binary file 410 into hexadecimal values, and the chunks 802 may include hexadecimal values.

In a particular implementation, the feature extraction instructions 125 include entropy calculation instructions 803. The entropy calculation instructions 803 may be configured to calculate an entropy (e.g., a Shannon entropy) for each of the chunks 802. For example, in FIG. 8, the binary file 410 is used to generate five chunks 802 and the entropy calculation instructions 803 generate data including five of entropy values 804. Entropy values may be calculated using Equation 1:

$$H = -\Sigma_i P_i \log_2 P_i \qquad \text{(Equation 1)}$$

where H is entropy, and $P_i$ is probability of each combination of values i. In a particular implementation, each byte of each of the chunks 802 is represented by a pair of hexadecimal characters. There are 256 possible values for a pair of hexadecimal characters. Thus, in this implementation, the entropy values (H) range between zero and eight where the maximum entropy (eight) is reached when P, takes a constant value of $\frac{1}{256}$ (i.e., every byte is completely random). In other implementations, other ranges of entropy values may be used depending on the chunking, how data within each chunk is grouped (e.g., into two hexadecimal values in the example above), and the base of the logarithm that is used to calculate the entropy.

The entropy values 804 may be used to generate entropy indicators. For example, the entropy values 804 may be processed by the entropy indicator generation instructions 805 to generate the entropy indicators 810. In a particular implementation, the entropy indicator generation instructions 805 perform a binning operation to assign each of the entropy values 804 to an entropy range bin corresponding to an entropy indicator. For example, in FIG. 8, the range of possible entropy values (0-8) is divided into 8 bins, and each bin is associated with a bin name. The bin names are used as entropy indicators.

To illustrate, in the example illustrated in FIG. 8, the entropy values 804 include a first entropy value of 1.30. The first entropy value of 1.30 is within a range of entropy values 1-2 associated with the second bin, and the bin name of second bin is "b". Accordingly, an entropy indicator "b" is included as a first entry of entropy indicators 810. Similarly, the entropy values 804 include a second entropy value of 1.30, which is represented in a second entry of the entropy indicators 810 by an entropy indicatory "b". Likewise, the entropy values 804 include a third entropy value of 7.35, which is represented in a third entry of the entropy indicators 810 by an entropy indicatory "h".

The length (e.g., number of fields) of the entropy indicators 810 depends on the length of the binary file 410 (or how many chucks are generated based on the binary file 410). Accordingly, the entropy indicators 810 may have more or fewer values depending on the length of the binary file 410. Thus, although the entropy indicators 810 of FIG. 8 include six fields corresponding to entropy indicators "b," "b," "h," "d," "b," and "a" this is for ease of illustration, and is not a limitation. Rather, different files are likely to have different file lengths, and thus, to generate different numbers of entropy indicators 810.

The vector generation instructions 126 may use a process similar to the process described in FIG. 4 in order to generate a feature vector (or feature vectors) having a known length based on the entropy indicators 810. For example, FIG. 8 illustrates the vector generation instructions 126 performing an operation 820 to generate a zero-skip vector 821 (e.g., a vector indicating occurrences of zero-skip bi-grams in the entropy indicators 810). The zero-skip vector 821 is generated in FIG. 8 using the same process that was used to generate the zero-skip vector 421 in FIG. 4. Thus, the zero-skip vector 821 has a length corresponding to the number of bins used by the entropy indicator generation instructions 805 squared. In the particular example illustrated in FIG. 8, the entropy indicator generation instructions 805 use eight bin; therefore, the zero-skip vector 821 has a length of 64 fields or values. As explained with reference to FIG. 4, the zero-skip vector 821 may be a Boolean vector, or each field of the zero-skip vector 821 may represent a count. If the zero-skip vector 821 is a Boolean vector, each field of the zero-skip vector 821 a binary value indicating whether the particular combination of entropy indicators is present in the entropy indicators 810. Alternatively, each field of the zero-skip vector 821 may have a value representing a count of occurrences of groups of entropy indicators in the entropy indicator 810.

In FIG. 8, the zero-skip vector 821 is illustrated as a bi-gram; however, in other implementations, the zero-skip vector 821 may include a tri-gram, a four-gram or an n-gram with a different value of n. For example, if the zero-skip vector 821 includes a tri-gram, each field of the zero-skip vector 821 represents occurrence of a series of three entropy indicators in the entropy indicators 810. In this example, the zero-skip vector 821 would have a length corresponding to P×P×P, where P=8, or 512 fields.

Additionally, although FIG. 8 illustrates only the zero-skip vector 821, in other implementations, the vector generation instructions 126 may use the entropy indicators 810 to generate a one-skip vector, a two-skip vector, a three-skip vector, or a four-skip vector, as described with reference to FIG. 4. Further, although FIG. 8 only illustrates the vector generation instructions 126 generating a single vector (i.e., the zero-skip vector 821), in other implementations, the vector generation instructions 126 in FIG. 8 may generate a set of vectors, such as the zero-skip vector 821 (i.e., a zero-skip bi-gram vector), a one-skip bi-gram vector (such as the one-skip vector 431 of FIG. 4), a two-skip bi-gram vector, a three-skip bi-gram vector, and a four-skip bi-gram vector (such as the four-skip vector 441 of FIG. 4).

The feature vector or vectors generated in FIG. 8 represent entropy values of regions (e.g., blocks) of the binary file of the binary file 410 and patterns of entropy values within binary file of the binary file 410. One advantage of representing entropy values via the vector is that patterns of entropy values may be retained from one generation or version of a malware code to a subsequent generation of version of the malware code. For example, one method of obscuring or hiding malware code from a signature-based malware detection program is to encrypt the malware code within the binary file. After the encrypted portion of the malware code has been identified using a signature-based recognition system, the malware code can be re-encrypted using a different encryption key. Re-encrypting using a different encryption key may change the malware code sufficiently to elude detection of the malware code by signature-based recognition system. However, re-encrypting the malware code using a different key does not change the distribution of entropy values within the file. Accordingly, using information about the pattern or distribution of entropy within the file may be able to detect the re-encrypted malware code that would not be detected by a signature-based malware detection application.

Figure 9:
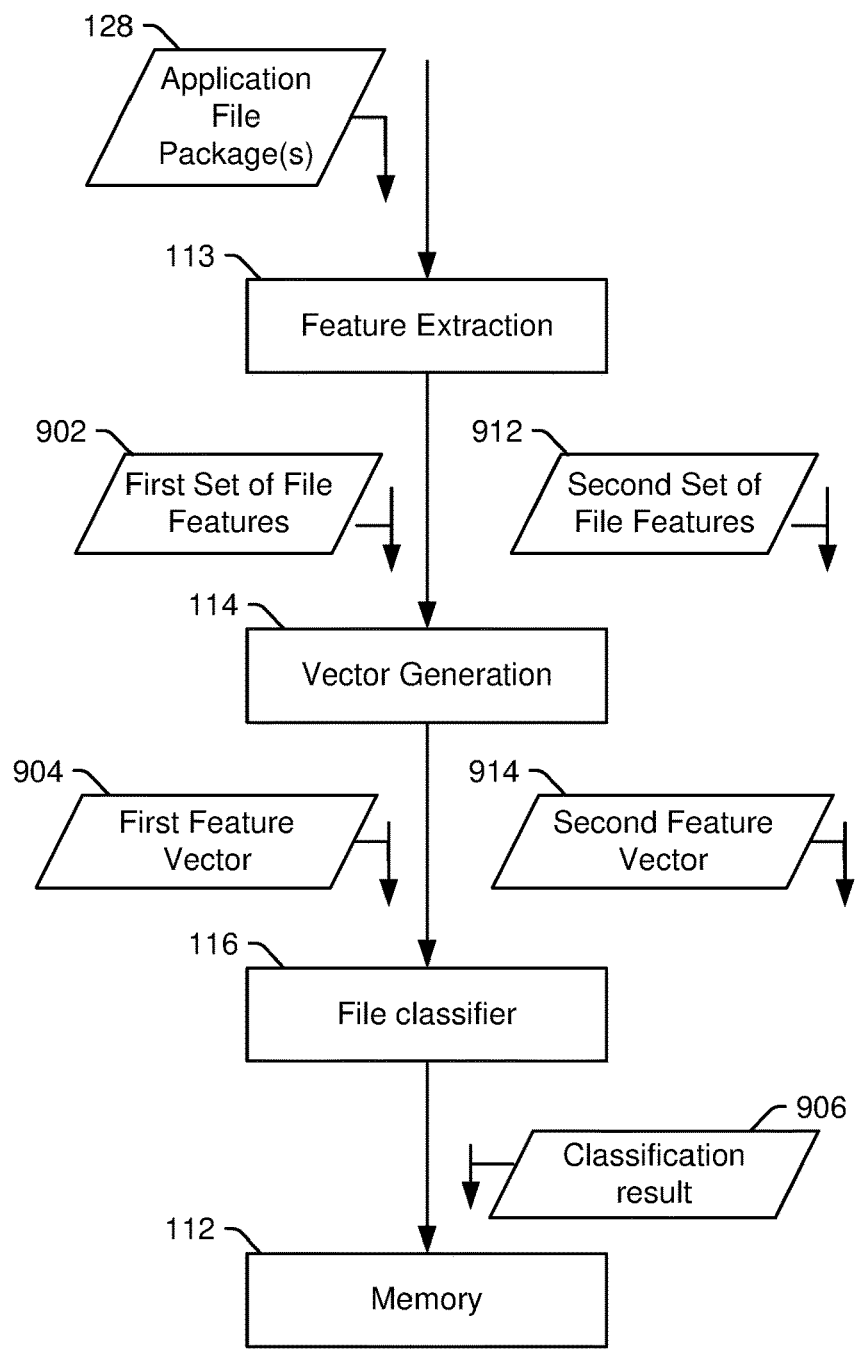
FIG. 9 illustrates a first example of a process of using a trained file classifier for malware detection.

FIG. 9 illustrates a first example of a process 900 of using the file classifier 116 for malware detection. In the example illustrated in FIG. 9, the application file package 128 is received at the first computing device 110 of FIGS. 1 and 2, the first computing device 110 executes the feature extraction instructions 113 to generate feature data and executes the vector generation instructions 114 to generate feature vectors, and the second computing device 120 executes the classification server application 127 (based on the file classifier 116) to determine whether the application file package 128 includes malware based on the feature vectors.

In FIG. 9, the application file package 128 is provided to feature extraction instructions 113. The feature extraction instructions 113 are configured to extract first file features 902 from the at least one file (e.g., a first subset of files) of the application file package 128. In a particular implementation, the feature extraction instructions 113 operate in the same manner as the feature extraction instructions 125 of FIGS. 2-8. For example, the first file features 902 extracted from the first subset of files of the application file package 128 by the feature extraction instructions 113 may include a set of characters (like the set of characters 412 of FIG. 4), may include a set of characters after performance of a hash function (as described with reference to FIG. 5), may include entropy indicators (like the entropy indicators 810 of FIG. 8), or a combination thereof.

Additionally, the feature extraction instructions 113 are configured to extract second file features 912 from at least one file (e.g., a second subset of files) of the application file package 128. In a particular implementation, the feature extraction instructions 113 operate in the same manner as the feature extraction instructions 125 of FIGS. 2-8. For example, the second file features 912 extracted from the second subset of files of the application file package 128 by the feature extraction instructions 113 may include a set requests for system permissions (like the extracted system permission requests 612 of FIG. 6), may include a set of API class references (like the extracted API class references 712 of FIG. 7), other attributes (e.g., extracted Linux commands, extracted application package receivers, etc.), or a combination thereof.

The first file features 902 and the second file features 912 may be provided to the vector generation instructions 114. The vector generation instructions 114 operate in the same manner as the vector generation instructions 126 of FIGS. 2-8. For example, the vector generation instructions 114 may generate one or more first feature vectors 904 based on the first file features 902 and one or more second feature vectors 914 based on the second file features 912. The one or more first feature vectors 904 may indicate occurrences of skip n-grams or zero-skip n-grams within the first file features 902, as described with reference to FIGS. 1-5 and 8. For example, the one or more first feature vectors 904 may include a vector representing presence of pairs of adjacent characters in a set of printable characters of the first file features 902, may represent a vector representing presence of n-grams (e.g., pairs of adjacent characters, pairs of non-adjacent characters, sets of more than two characters, etc.) in a reduced character n-gram representation (as described with reference to FIG. 5), may represent groups of entropy indicators in a set of entropy indicators of the first file features 902, or a combination thereof. The one or more second feature vectors 914 may indicate occurrences of attributes within the second file features 912, as described with reference to FIGS. 1-3, 6, and 7. For example, the one or more second feature vectors 914 may include a vector representing presences of requests for system permissions of a group of system permissions, representing API class references of a group of API class references, or both.

The one or more first feature vectors 904 and the one or more second feature vectors 914 may be provided as input to the file classifier 116. As explained above, the file classifier 116 may include a DNN, a support vector machine, a decision tree, or another data structure generated to model the supervised training data 224 of FIG. 3. In another particular implementation, the file classifier 116 may include a convolutional neural network, a shift invariant neural network, or a SIANN. The convolutional neural network may be configured to exploit locality (e.g., spatial relationships) of features extracted from application file packages. The file classifier 116 may generate data representing a classification result 906 for the application file package 128 based on the one or more first feature vectors 904 and the one or more second feature vectors 914. For example, the classification result 906 may indicate whether or not the application file package 128 includes malware. Alternatively, the classification result 906 may indicate that the application file package 128 does not include malware, or that the application file package 128 includes a particular type of malware, such as a trojan, adware, or a worm. The classification result 906 may be provided to the first computing device 110 and stored at the memory 112 along with a file identifier (such as the file identifier 130 of FIG. 1). Alternatively, or in addition, the classification result 906 may be stored in the memory 122 of the second computing device 120 along with the file identifier (such as the file identifier 130 of FIG. 1) of the application file package 128. In a particular implementation, the classification result 906 may be provided as an output to a user (e.g., via the display device 131 of FIG. 1) to indicate whether the application file package 128 is safe to use.

In a particular implementation, the classification result 906 and the file identifier 130 may be used as a white list or black list to check files received in the future. For example, when another application file package is received, a file identifier of the other file may be generated and checked against file identifiers in the memory 122 (or the memory 112) to determine whether the new application file package has been previously checked using the file classifier 116. In this example, one or more of the feature extraction instructions 113, the vector generation instructions 114, or the file classifier 116 may be executed based on determining that the file identifier of the new application file package does not match the identifier of a previously checked application file package.

Figure 10:
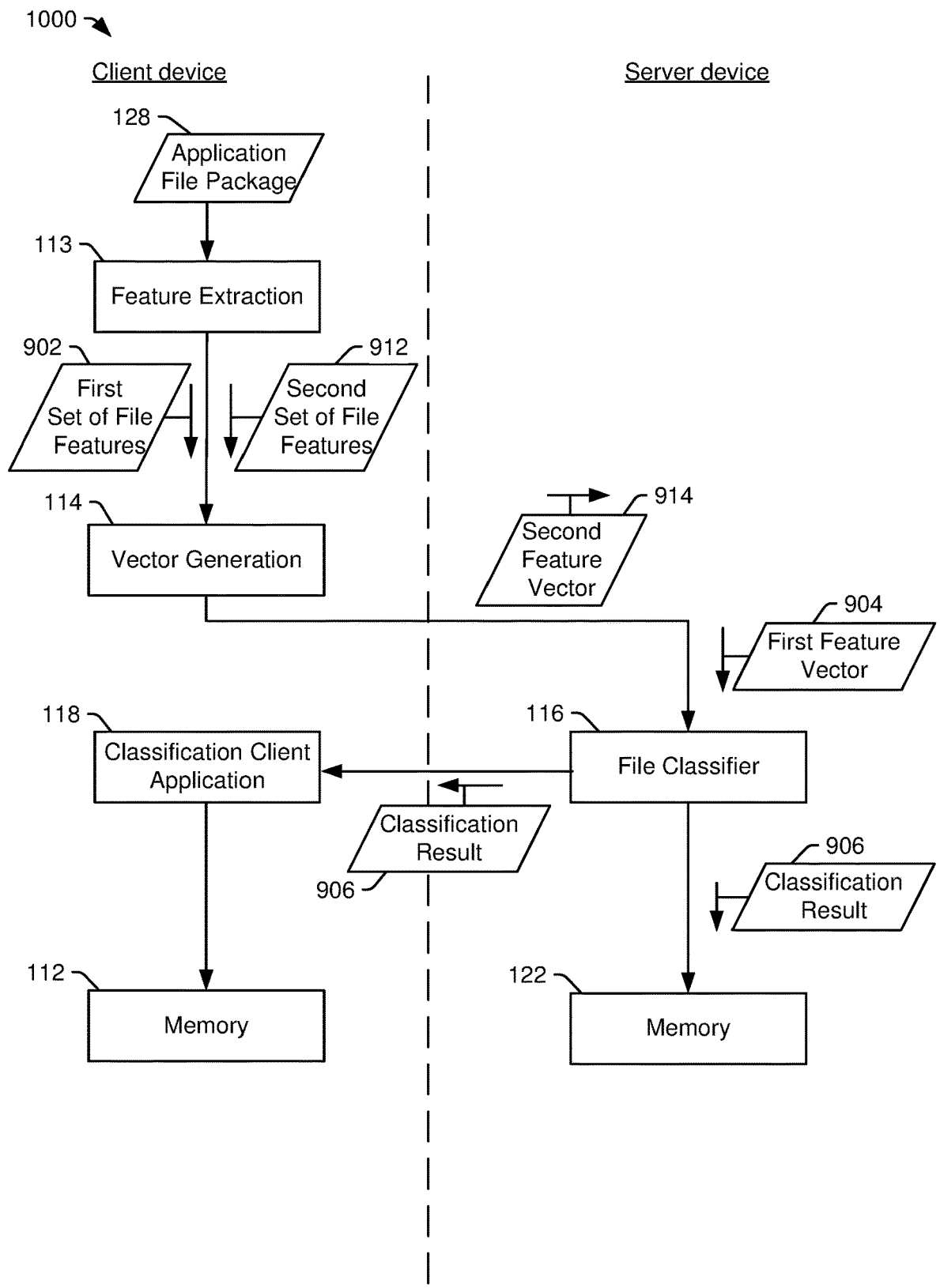
FIG. 10 illustrates a second example of a process of using a trained file classifier for malware detection.

FIG. 10 illustrates a second example of a process 1000 of using the file classifier 116 for malware detection. In the example illustrated in FIG. 10, the application file package 128 is received at a client computing device (e.g., the first computing device 110 of FIGS. 1 and 2), which sends file features to a server computing device (e.g., the second computing device 120), and the server computing device executes the classification server application 127 (based on the file classifier 116) to determine whether the application file package 128 includes malware.

In FIG. 10, the application file package 128 is provided to the feature extraction instructions 113 of the client computing device. The feature extraction instructions 113 are configured to extract the first file features 902 and the second file features 912 from the application file package 128. In a particular implementation, the feature extraction instructions 113 operate in the same manner as the feature extraction instructions 125 of FIGS. 2-8. For example, the first file features 902 extracted from the application file package 128 by the feature extraction instructions 113 may include a set of characters (like the set of characters 412 of FIG. 4), may include a set of character n-grams after application of a hash function (as described with reference to FIG. 5), may include entropy indicators (like the entropy indicators 810 of FIG. 8), or a combination thereof. As another example, the second file features 912 extracted from the application file package 128 by the feature extraction instructions 113 may include a set of requests for system permissions (like the set of system permission requests 612 of FIG. 6), may include a set of API class references (like the extracted API class references 712 of FIG. 7), other attributes (e.g., extracted Linux commands, extracted application package receivers, etc.), or a combination thereof.

The client computing device generates the one or more first feature vectors 904 based on the first file features 902 and generates the one or more second feature vectors 914 based on the second file features 912. In other implementations, the server computing device includes the vector generation instructions 114, and the client device sends the first file features 902 and the second file features 912 to the second computing device. The vector generation instructions 114 operate in the same manner as the vector generation instructions 126 of FIGS. 2-8. For example, the vector generation instructions 114 may generate one or more first feature vectors 904 based on the first file features 902 and one or more second feature vectors 914 based on the second file features 912. The one or more first feature vectors 904 may indicate occurrences of skip n-grams or zero-skip n-grams within the first file features 902, as described with reference to FIGS. 1-5 and 8. For example, the one or more first feature vectors 904 may include a vector representing presence of pairs of adjacent characters in a set of printable characters of the first file features 902, may represent a vector representing presence of n-grams (e.g., pairs of adjacent characters, pairs of non-adjacent characters, sets of more than two characters, etc.) in a reduced character n-gram representation (as described with reference to FIG. 5), may represent groups of entropy indicators in a set of entropy indicators of the first file features 902, or a combination thereof. The one or more second feature vectors 914 may indicate occurrences of attributes within the second file features 912, as described with reference to FIGS. 1-3, 6, and 7. For example, the one or more second feature vectors 914 may include a vector representing presences of requests for system permissions of a group of system permissions, representing API class references of a group of API class references, or both.

The client computing device sends the one or more first feature vectors 904 and the one or more second feature vectors 914 to the server computing device. The server computing device may execute the classification server application 127 of FIG. 1 to provide the one or more first feature vectors 904 and the one or more second feature vectors 914 to the file classifier 116 as input. As explained above, the file classifier 116 may include a deep neural network, a support vector machine, a decision tree, or another data structure generated to model the supervised training data 224 of FIG. 3. The file classifier 116 may generate data representing a classification result 906 for the application file package 128 based on the one or more first feature vectors 904 and the one or more second feature vectors 914. For example, the classification result 906 may indicate whether or not the application file package 128 includes malware. Alternatively, the classification result 906 may indicate that the application file package 128 does not include malware, or that the application file package 128 includes a particular type of malware, such as a trojan, adware, or a worm. The classification result 906 may be provided to the client computing device (executing the classification client application 118) and stored at the memory 112 along with a file identifier (such as the file identifier 130 of FIG. 1). Alternatively, or in addition, the classification result 906 may be stored in the memory 122 of the second computing device 120 along with the file identifier (such as the file identifier 130 of FIG. 1) of the application file package 128.

The classification client application 118 of the client computing device may generate an output (e.g., via the display device 131 of FIG. 1) to indicate whether the application file package 128 is safe to use. In some implementations, the classification client application 118 may quarantine or otherwise restrict access to or execution of the application file package 128 if the application file package 128 is determined to include malware.

Figure 11:
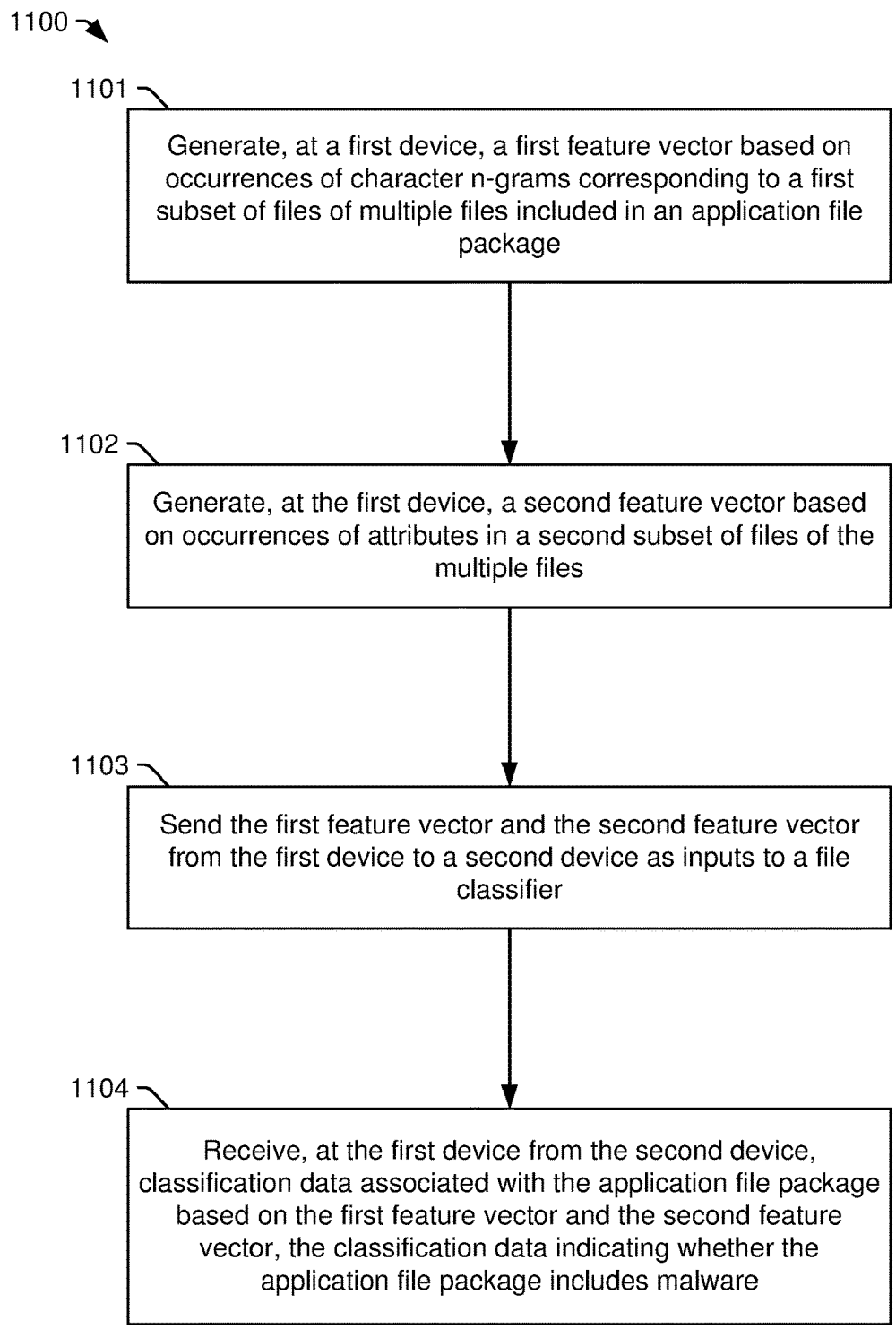
FIG. 11 is a flowchart illustrating a particular example of a method of generating feature vectors and receiving classification data.

FIG. 11 is a flowchart illustrating a particular example of a method 1100 of generating feature vectors and receiving classification data. The method 1100 may be performed by the first computing device 110 of FIGS. 1 and 2. For example, the processor 111 executing instructions from the memory 112 may perform the method 1100.

The method 1100 includes, at 1101, generating, at a first device, a first feature vector based on occurrences of character n-grams corresponding to a first subset of files of multiple files included in an application file package. For example, the processor 111 of the first computing device 110 of FIG. 1 executing the vector generation instructions 114 may generate the first feature vector 160 based on occurrences of n-grams corresponding to the first subset of files 132. The character n-grams may correspond to pairs of adjacent characters in printable characters representing the first subset of files or to pairs of non-adjacent characters in the printable characters. In some implementations, the character n-grams correspond to groups of more than two printable characters representing the first subset of files.

The method 1100 includes, at 1102, generating, at the first device, a second feature vector based on occurrences of attributes in a second subset of files of the multiple files. For example, the processor 111 of the first computing device 110 of FIG. 1 executing the vector generation instructions 114 may generate the second feature vector 161 based on occurrences of attributes in the second subset of files 133.

The method 1100 includes, at 1103, sending the first feature vector and the second feature vector from the first device to a second device as inputs to a file classifier. For example, the first computing device 110 may send the first feature vector 160 and the second feature vector 161 to the second computing device 120 via the network 140. The first feature vector 160 and the second feature vector 161 may be used as inputs to the file classifier 116.

The method 1100 includes, at 1104, receiving, at the first device from the second device, classification data associated with the application file package based on the first feature vector and the second feature vector, the classification data indicating whether the application file package includes malware. For example, the first computing device 110 of FIG. 1 may receive the classification data 162. The classification data 162 may be output by the file classifier 116 based on the first feature vector 160 and the second feature vector 161 and may indicate whether the application file package 128 includes malware.

In a particular implementation, the method 1100 includes processing the first subset of files to generate printable characters representing the first subset of files and processing the printable characters to generate the character n-grams. For example, the feature extraction instructions 113 of FIG. 1 may include the string extraction instructions 411 of FIGS. 4 and 5.

In another particular implementation, the method 1100 includes applying a hash function to the character n-grams to generate a reduced character n-gram representation. For example, the hash function 506 of FIG. 5 may be applied to the character n-gram representation 504 to generate the reduced character n-gram representation 508. The first feature vector (e.g., the first feature vector 510 of FIG. 5) may include a Boolean vector indicating occurrences of character n-grams in the reduced character n-gram representation.

In another particular implementation, the method 1100 includes processing the first subset of files to generate a sequence of entropy indicators, each entropy indicator of the sequence of entropy indicators corresponding to a chunk of the first subset of files. For example, the feature extraction instructions 125 may be executed to generate the entropy indicators 810 of FIG. 8. In some implementations, the method 1100 further includes generating a third feature vector based on the sequence of entropy indicators and sending the third feature vector from the first device to the second device. For example, the zero-skip vector 821 may be generated based on the entropy indicators 810 and sent to the second computing device 120. In some implementations, the second feature vector 161 and the zero-skip vector 821 are concatenated to the first feature vector 160 prior to being sent to the second computing device 120.

In another particular implementation, the method 1100 includes analyzing the second subset of files to determine requests for system permissions associated with the first device. For example, the feature extraction instructions 125 may include the system permission request extraction instructions 611 of FIG. 6. The second feature vector (e.g., the feature vector 621 of FIG. 6) may include a Boolean vector indicating whether each system permission of a group of system permissions is indicated by the second subset of files.

In another particular implementation, the method 1100 includes analyzing the second subset of files to determine references to application programming interface (API) classes in the second subset of files. For example, the feature extraction instructions 125 may include the API class reference extraction instructions 711 of FIG. 7. The second feature vector (e.g., the feature vector 721 of FIG. 7) may include a Boolean vector indicating whether each API class of a group of API classes is referenced by the second subset of files.

Thus, the method 1100 may be able to identify malware that has not been identified as malware by another method, such as a signature-based detection method. For example, a trained file classifier may be able to identify application file packages that contain so called "zero day" malware, for which no malware definition is yet available, based on the feature vectors of the new application file packages. Thus, the method 1100 may enable malware detection at computing devices of "zero day" malware that may otherwise be undetectable.

FIG. 12 is a flowchart illustrating a particular example of a method 1200 of generating a file classifier. The method 1200 may be performed by the second computing device 120 of FIGS. 1 and 2. For example, the processor 121 executing the classification server application 127 from the memory 122 may perform the method 1200.

The method 1200 includes, at 1201, accessing information identifying multiple application file packages and identifying classification data for the multiple application file packages, where the classification data indicates, for a particular application file package of the multiple application file packages, whether the particular application file package includes malware. For example, the processor 151 of the third computing device 150 may access the classification data 103 and the application file packages 104 to generate the file classifier 116.

The method 1200 includes, at 1202, generating first feature vectors for the multiple application file packages by, for each application file package, generating a first feature vector based on occurrences of character n-grams corresponding to a first subset of files of multiple files included in the application file package. For example, the processor 151 executing the feature extraction instructions 125 and the vector generation instructions 126 may generate one or more n-gram vectors for the application file packages 104 as inputs to the file classifier 116.

The method 1200 includes, at 1203, generating second feature vectors for the multiple application file packages by, for each application file package, generating a second feature vector based on occurrences of attributes in a second subset of files of the multiple files. For example, the processor 151 executing the feature extraction instructions 125 and the vector generation instructions 126 may generate one or more vectors of attributes (e.g., system permission requests, API class references, etc.) for the application file packages 104 as inputs to the file classifier 116.

The method 1200 also includes, at 1204, generating and storing a file classifier using the first feature vectors, the second feature vectors, and the classification data as supervised training data. For example, the processor 151 may execute the classifier generation instructions 115 to generate the file classifier 116 based on the feature vectors (e.g., the feature vectors based on character n-grams and the feature vectors indicating attributes).

Thus, the method 1200 may generate and train a file classifier to identify malware that has not been identified as malware by other malware detection techniques, such as signature-based detection techniques. For example, the trained file classifier may be able to identify application file packages that contain so called "zero day" malware, for which no malware definition is yet available. The trained file classifier may be able to identify application file packages that contain malware based on feature vectors of the application file packages. Thus, the method 1200 may generate a file classifier that enables malware detection of "zero day" malware that may otherwise be undetectable.

The systems and methods illustrated herein may be described in terms of functional block components, screen shots, optional selections and various processing steps. It should be appreciated that such functional blocks may be realized by any number of hardware and/or software components configured to perform the specified functions. For example, a system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. A computer-readable storage medium or device is not a signal.

Systems and methods may be described herein with reference to screen shots, block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Methods disclose herein may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A computing device comprising:
   a memory configured to store instructions; and
   a processor configured to execute the instructions from the memory to perform operations comprising:
      identifying, among multiple files of a file package, a first plurality of files having a first file type, the file package including multiple files of two or more different file types;
      identifying, among the multiple files of the file package, a second plurality of files having a second file type, wherein the second file type is distinct from the first file type;
      generating, based on the first file type, a first feature vector based on first features extracted from the first plurality of files;
      generating, based on the second file type, a second feature vector based on second features extracted from the second plurality of files, wherein the first features are distinct from the second features; and
      generating classification data associated with the file package, the classification data indicating whether the file package includes malware, wherein the classification data is generated based on the first feature vector and the second feature vector.

2. The computing device of claim 1, wherein the first features correspond to character information associated with the first plurality of files, and wherein the second features correspond to an occurrence of attributes in the second plurality of files.

3. The computing device of claim 1, wherein the first file type is an executable file type and the second file type is a non-executable file type.

4. The computing device of claim 1, wherein the first feature vector is generated based on:
   zero-skip n-gram data indicating occurrences of adjacent characters in printable characters representing a first file of the first plurality of files;

skip n-gram data indicating occurrences of non-adjacent characters in the printable characters representing the first file; and n-gram data indicating occurrences of groups of entropy indicators in a first set of entropy indicators derived from first file entropy data for the first file, each entropy indicator of the first set of entropy indicators having a value representing entropy of a corresponding chunk of the first file.

5. The computing device of claim 1, wherein the second feature vector is based on occurrences of attributes in a second file of the second plurality of files.

6. The computing device of claim 5, wherein the attributes include requests for system permissions indicated by the second file.

7. The computing device of claim 6, wherein the second feature vector includes a Boolean vector indicating whether each system permission of a particular group of system permissions is requested by the second file.

8. The computing device of claim 5, wherein the attributes include references to application programming interface (API) classes associated with an operating system executed by the processor, the references to the API classes indicated by the second file.

9. The computing device of claim 1, wherein the second feature vector indicates that particular information is present in a second file of the second plurality of files.

10. The computing device of claim 1, wherein the operations further comprise initiating performance of one or more malware protection operations based on the classification data indicating that the file package includes malware.

11. The computing device of claim 1, wherein the file package corresponds to an application file package of a mobile device application.

12. The computing device of claim 1, wherein the classification data is generated using a feed-forward neural network that includes at least one hidden layer.

13. A method comprising:
identifying, among multiple files of a file package, a first plurality of files having a first file type, where the multiple files of the file package include two or more different file types;
identifying, among the multiple files of the file package, a second plurality of files having a second file type, wherein the second file type is distinct from the first file type;
generating, based on the first file type, a first feature vector based on first features extracted from the first plurality of files;
generating, based on the second file type, a second feature vector based on second features extracted from the second plurality of files, wherein the first features are distinct from the second features; and
generating classification data associated with the file package, the classification data indicating whether the file package includes malware, wherein the classification data is generated based on the first feature vector and the second feature vector.

14. The method of claim 13, wherein the first file type corresponds to an executable file type, and wherein the first feature vector is generated based on:
zero-skip n-gram data for the first plurality of files, first zero-skip n-gram data of the zero-skip n-gram data indicating occurrences of adjacent characters in printable characters representing a first file of the first plurality of files;
skip n-gram data for the first plurality of files, first skip n-gram data of the skip n-gram data indicating occurrences of non-adjacent characters in the printable characters representing the first file; and
n-gram data for the first plurality of files, first n-gram data of the n-gram data indicating occurrences of groups of entropy indicators in a first set of entropy indicators derived from first file entropy data for the first file, each entropy indicator of the first set of entropy indicators having a value representing entropy of a corresponding chunk of the first file.

15. The method of claim 13, further comprising combining the first feature vector and the second feature vector to generate a combined feature vector, wherein the classification data is generated based on the combined feature vector.

16. The method of claim 13, wherein the second feature vector is based on occurrences of attributes in the second plurality of files.

17. The method of claim 13, further comprising:
processing the first plurality of files to generate printable characters representing the first plurality of files; and
processing the printable characters to generate zero-skip n-gram data and skip n-gram data.

18. The method of claim 17, further comprising applying a hash function to the skip n-gram data to generate a reduced skip n-gram representation, and wherein the first feature vector includes a Boolean vector indicating occurrences of skip n-grams in the reduced skip n-gram representation.

19. A computer-readable storage device storing instructions that, when executed, cause a computer to perform operations comprising:
identifying, among multiple files, a first plurality of files having a first file type, where the multiple files include two or more different file types;
identifying, among the multiple files, a second plurality of files including a second plurality of files having a second file type, wherein the second file type is distinct from the first file type;
generating, based on the first file type, a first feature vector based on first features extracted from the first plurality of files;
generating, based on the second file type, a second feature vector based on second features extracted from the second plurality of files, wherein the first features are distinct from the second features; and
generating classification data associated with the multiple files, the classification data indicating whether the multiple files includes malware, wherein the classification data is generated based on the first feature vector and the second feature vector.

20. The computer-readable storage device of claim 19, wherein the classification data associated with the multiple files is further based on the second feature vector wherein the first features correspond to entropy information associated with the first plurality of files, and wherein the second features correspond to an occurrence of attributes in the second plurality of files.

* * * * *

UNITED STATES PATENT AND TRADEMARK OFFICE
CERTIFICATE OF CORRECTION

| | | |
|---|---|---|
| PATENT NO. | : 11,711,388 B2 | Page 1 of 1 |
| APPLICATION NO. | : 17/228194 | |
| DATED | : July 25, 2023 | |
| INVENTOR(S) | : Lucas McLane and Jarred Capellman | |

It is certified that error appears in the above-identified patent and that said Letters Patent is hereby corrected as shown below:

In the Claims

Column 40, Line 57, delete "wherein the classification data associated with the multiple files is further based on the second feature vector".

Signed and Sealed this
Twenty-ninth Day of August, 2023

Katherine Kelly Vidal
*Director of the United States Patent and Trademark Office*